US012715139B2

(12) United States Patent
Lonsberry et al.

(10) Patent No.: US 12,715,139 B2
(45) Date of Patent: Aug. 25, 2026

(54) AUTONOMOUS WELDING ROBOTS

(71) Applicant: Path Robotics, Inc., Columbus, OH (US)

(72) Inventors: Alexander James Lonsberry, Gahanna, OH (US); Andrew Gordon Lonsberry, Columbus, OH (US); Nima Ajam Gard, Columbus, OH (US); Colin Bunker, Columbus, OH (US); Carlos Fabian Benitez Quiroz, Columbus, OH (US); Madhavun Candadai Vasu, Columbus, OH (US)

(73) Assignee: Path Robotics, Inc., Columbus, OH (US)

( * ) Notice: Subject to any disclaimer, the term of this patent is extended or adjusted under 35 U.S.C. 154(b) by 215 days.

(21) Appl. No.: 18/790,732

(22) Filed: Jul. 31, 2024

(65) Prior Publication Data

US 2024/0391109 A1 Nov. 28, 2024

Related U.S. Application Data

(63) Continuation of application No. 18/469,506, filed on Sep. 18, 2023, now Pat. No. 12,070,867, which is a
(Continued)

(51) Int. Cl.
*B25J 9/16* (2006.01)
*B23K 9/095* (2006.01)
(Continued)

(52) U.S. Cl.
CPC ........... *B25J 9/1697* (2013.01); *B23K 9/0956* (2013.01); *B23K 37/0229* (2013.01);
(Continued)

(58) Field of Classification Search
CPC .... B23K 11/252; B23K 26/04; B23K 26/044; B23K 37/00; B23K 9/0953; B23K 9/10;
(Continued)

(56) References Cited

U.S. PATENT DOCUMENTS 1,724,301 A 8/1929 Moriarty
3,532,807 A 10/1970 Wall, Jr. et al.
(Continued)

FOREIGN PATENT DOCUMENTS

CN 110064818 A 7/2019
CN 110270997 A 9/2019
(Continued)

OTHER PUBLICATIONS

Ahmed, S.M. (Oct. 2016) "Object Detection and Motion Planning for Automated Welding of Tibular Joints", 2016 IEEEIRSJ International Conference on Intelligent Robots and Systems, Daejeon, Korea, Oct. 9-14: pp. 2610-2615.
(Continued)

*Primary Examiner* — Alex Kok S Liew
(74) *Attorney, Agent, or Firm* — IPkey PLLC

(57) ABSTRACT

In some examples, an autonomous robotic welding system comprises a workspace including a part having a seam, a sensor configured to capture multiple images within the workspace, a robot configured to lay weld along the seam, and a controller. The controller is configured to identify the seam on the part in the workspace based on the multiple images, plan a path for the robot to follow when welding the seam, the path including multiple different configurations of the robot, and instruct the robot to weld the seam according to the planned path.

13 Claims, 7 Drawing Sheets

Related U.S. Application Data continuation of application No. 17/902,748, filed on Sep. 2, 2022, now Pat. No. 11,801,606, which is a continuation of application No. 17/680,027, filed on Feb. 24, 2022, now Pat. No. 11,548,162.

(60) Provisional application No. 63/282,827, filed on Nov. 24, 2021, provisional application No. 63/153,109, filed on Feb. 24, 2021.

(51) Int. Cl.

| | |
|---|---|
| ***B23K 37/02*** | (2006.01) |
| ***B23K 37/04*** | (2006.01) |
| ***B25J 11/00*** | (2006.01) |
| ***B25J 13/08*** | (2006.01) |
| ***B25J 15/00*** | (2006.01) |
| ***G06T 7/00*** | (2017.01) |
| ***G06T 7/70*** | (2017.01) |
| ***G06V 10/764*** | (2022.01) |
| ***G06V 10/82*** | (2022.01) |

(52) U.S. Cl.
CPC .......... *B23K 37/0258* (2013.01); *B23K 37/04* (2013.01); *B25J 9/161* (2013.01); *B25J 9/1666* (2013.01); *B25J 9/1671* (2013.01); *B25J 11/005* (2013.01); *B25J 13/08* (2013.01); *B25J 15/0019* (2013.01); *G06T 7/0004* (2013.01); *G06T 7/70* (2017.01); *G06V 10/764* (2022.01); *G06V 10/82* (2022.01); *G06T 2207/10028* (2013.01); *G06T 2207/20084* (2013.01); *G06V 2201/06* (2022.01)

(58) Field of Classification Search
CPC .... B23K 9/1062; B23K 9/126; B23K 9/1278; B23K 9/0956; B23K 9/1274; G01B 11/26
See application file for complete search history.

(56) References Cited

U.S. PATENT DOCUMENTS 4,011,437 A 3/1977 Hohn
4,021,840 A 5/1977 Ellsworth et al.
4,148,061 A 4/1979 Lemelson
4,234,777 A 11/1980 Balfanz
4,255,643 A 3/1981 Balfanz
4,380,696 A 4/1983 Masaki
4,412,121 A 10/1983 Kremers et al.
4,482,968 A 11/1984 Inaba et al.
4,492,847 A 1/1985 Masaki et al.
4,495,588 A 1/1985 Nio et al.
4,497,019 A 1/1985 Waber
4,497,996 A 2/1985 Libby, Jr. et al.
4,515,521 A 5/1985 Takeo et al.
4,553,077 A 11/1985 Brantmark et al.
4,555,613 A 11/1985 Shulman
4,561,050 A 12/1985 Iguchi et al.
4,567,348 A 1/1986 Smith et al.
4,568,816 A 2/1986 Casler, Jr.
4,575,304 A 3/1986 Nakagawa et al.
4,578,554 A 3/1986 Coulter
4,580,229 A 4/1986 Koyama et al.
4,587,396 A 5/1986 Rubin
4,590,577 A 5/1986 Nio et al.
4,593,173 A 6/1986 Bromley et al.
4,594,497 A 6/1986 Takahashi et al.
4,595,989 A 6/1986 Yasukawa et al.
4,613,942 A 9/1986 Chen
4,616,121 A 10/1986 Clocksin et al.
4,617,504 A 10/1986 Detriche
4,642,752 A 2/1987 Debarbieri et al.
4,652,803 A 3/1987 Kamejima et al.
4,675,502 A 6/1987 Haefner et al.
4,677,568 A 6/1987 Arbter
4,685,862 A 8/1987 Nagai et al.
4,724,301 A 2/1988 Shibata et al.
4,725,965 A 2/1988 Keenan
4,744,039 A 5/1988 Suzuki et al.
4,745,857 A 5/1988 Putnam et al.
4,757,180 A 7/1988 Kainz et al.
4,804,860 A 2/1989 Ross et al.
4,812,614 A 3/1989 Wang et al.
4,833,383 A 5/1989 Skarr et al.
4,833,624 A 5/1989 Kuwahara et al.
4,837,487 A 6/1989 Kurakake et al.
4,845,992 A 7/1989 Dean
4,899,095 A 2/1990 Kishi et al.
4,906,907 A 3/1990 Tsuchihashi et al.
4,907,169 A 3/1990 Lovoi
4,924,063 A 5/1990 Buchel et al.
4,945,493 A 7/1990 Huang et al.
4,969,108 A 11/1990 Webb et al.
4,973,216 A 11/1990 Domm
5,001,324 A 3/1991 Aiello et al.
5,006,999 A 4/1991 Kuno et al.
5,053,976 A 10/1991 Nose et al.
5,083,073 A 1/1992 Kato
5,096,353 A 3/1992 Tesh et al.
5,154,717 A 10/1992 Matsen, III et al.
5,159,745 A 11/1992 Kato
5,219,264 A 6/1993 McClure et al.
5,245,409 A 9/1993 Tobar
5,288,991 A 2/1994 King et al.
5,300,869 A 4/1994 Skaar et al.
5,326,469 A 7/1994 Thompson
5,329,469 A 7/1994 Watanabe
5,379,721 A 1/1995 Dessing et al.
5,457,773 A 10/1995 Jeon
5,465,037 A 11/1995 Huissoon et al.
5,479,078 A 12/1995 Karakama et al.
5,511,007 A 4/1996 Nihei et al.
5,532,924 A 7/1996 Hara et al.
5,570,458 A 10/1996 Umeno et al.
5,572,102 A 11/1996 Goodfellow et al.
5,598,345 A 1/1997 Tokura
5,600,760 A 2/1997 Pryor
5,602,967 A 2/1997 Pryor
5,608,847 A 3/1997 Pryor
5,612,785 A 3/1997 Boillot et al.
5,624,588 A 4/1997 Terawaki et al.
5,828,566 A 10/1998 Pryor
5,906,761 A 5/1999 Gilliland et al.
5,925,268 A 7/1999 Britnell
5,956,417 A 9/1999 Pryor
5,959,425 A 9/1999 Bieman et al.
5,961,858 A 10/1999 Britnell
6,035,695 A 3/2000 Kim
6,044,308 A 3/2000 Huissoon
6,049,059 A 4/2000 Kim
6,084,203 A 7/2000 Bonigen
6,163,946 A 12/2000 Pryor
6,167,607 B1 1/2001 Pryor
6,304,050 B1 10/2001 Skaar et al.
6,429,404 B1 8/2002 Suzuki
6,430,474 B1 8/2002 DiStasio et al.
6,804,580 B1 10/2004 Stoddard et al.
6,909,066 B2 6/2005 Zheng et al.
7,130,718 B2 10/2006 Gunnarsson et al.
7,151,848 B1 12/2006 Watanabe et al.
7,734,358 B2 6/2010 Watanabe et al.
7,805,219 B2 9/2010 Ishikawa et al.
7,813,830 B2 10/2010 Summers et al.
7,818,091 B2 10/2010 Kazi et al.
7,946,439 B1 5/2011 Toscano et al.
8,338,743 B2 12/2012 Wanner et al.
8,494,678 B2 7/2013 Quandt et al.
8,525,070 B2 9/2013 Tanaka et al.
8,538,125 B2 9/2013 Linnenkohl et al.
8,644,984 B2 2/2014 Nagatsuka et al.
9,067,321 B2 6/2015 Landsnes
9,221,117 B2 12/2015 Conrardy et al.

(56) References Cited

U.S. PATENT DOCUMENTS 9,221,137 B2 12/2015 Otts
9,666,160 B2 5/2017 Patel et al.
9,685,099 B2 6/2017 Boulware et al.
9,724,787 B2 8/2017 Becker et al.
9,773,429 B2 9/2017 Boulware et al.
9,779,635 B2 10/2017 Zboray et al.
9,799,635 B2 10/2017 Kuriki et al.
9,802,277 B2 10/2017 Beatty et al.
9,821,415 B2 11/2017 Rajagopalan et al.
9,836,987 B2 12/2017 Postlethwaite et al.
9,937,577 B2 4/2018 Daniel et al.
9,975,196 B2 5/2018 Zhang et al.
9,977,242 B2 5/2018 Patel et al.
9,993,891 B2 6/2018 Wiryadinata
10,040,141 B2 8/2018 Rajagopalan et al.
10,083,627 B2 9/2018 Daniel et al.
10,191,470 B2 1/2019 Inoue
10,197,987 B2 2/2019 Battles et al.
10,198,962 B2 2/2019 Postlethwaite et al.
10,201,868 B2 2/2019 Dunahoo et al.
10,551,179 B2 2/2020 Lonsberry et al.
10,705,024 B2 7/2020 Narayanan et al.
11,034,024 B2 6/2021 Saez et al.
11,067,965 B2 7/2021 Spieker et al.
11,179,793 B2 11/2021 Atherton et al.
11,407,110 B2 8/2022 Lonsberry et al.
11,759,952 B2 9/2023 Lonsberry et al.
2001/0004718 A1 6/2001 Gilliland et al.
2003/0108234 A1 6/2003 Fujita et al.
2004/0105519 A1 6/2004 Yamada et al.
2005/0023261 A1 2/2005 Zheng et al.
2006/0047363 A1 3/2006 Farrelly et al.
2006/0049153 A1 3/2006 Cahoon et al.
2006/0140473 A1* 6/2006 Brooksby ............ G01N 21/952 382/285
2008/0114492 A1* 5/2008 Miegel .................. B25J 9/1664 901/6
2008/0125893 A1 5/2008 Tilove et al.
2009/0075274 A1 3/2009 Slepnev et al.
2009/0139968 A1 6/2009 Hesse et al.
2010/0114338 A1 5/2010 Bandyopadhyay et al.
2010/0152870 A1 6/2010 Wanner et al.
2010/0206938 A1 8/2010 Quandt et al.
2010/0274390 A1 10/2010 Walser et al.
2011/0141251 A1 6/2011 Marks et al.
2011/0297666 A1 12/2011 Ihle et al.
2012/0096702 A1 4/2012 Kingsley et al.
2012/0267349 A1 10/2012 Berndl et al.
2013/0119040 A1 5/2013 Suraba et al.
2013/0123801 A1 5/2013 Umasuthan et al.
2013/0259376 A1* 10/2013 Louban .................... G06T 7/66 382/173
2014/0088577 A1 3/2014 Anastassiou et al.
2014/0100694 A1 4/2014 Rueckl et al.
2014/0365009 A1 12/2014 Wettels et al.
2015/0122781 A1 5/2015 Albrecht
2015/0127162 A1 5/2015 Gotou
2016/0096269 A1 4/2016 Atohira et al.
2016/0125592 A1 5/2016 Becker et al.
2016/0125593 A1 5/2016 Becker et al.
2016/0224012 A1 8/2016 Hunt
2016/0257000 A1 9/2016 Guerin et al.
2016/0257070 A1 9/2016 Boydston et al.
2016/0267636 A1 9/2016 Duplaix et al.
2016/0267806 A1 9/2016 Hsu et al.
2017/0072507 A1 3/2017 Legault
2017/0132807 A1 5/2017 Shivaram et al.
2017/0232615 A1 8/2017 Hammock et al.
2017/0266758 A1 9/2017 Fukui et al.
2017/0364076 A1 12/2017 Keshmiri et al.
2017/0368649 A1 12/2017 Marrocco et al.
2018/0043471 A1 2/2018 Aoki
2018/0065204 A1 3/2018 Burrows et al.
2018/0117701 A1 5/2018 Ge et al.
2018/0130226 A1 5/2018 Meess et al.
2018/0147662 A1 5/2018 Furuya
2018/0266961 A1 9/2018 Narayanan et al.
2018/0266967 A1 9/2018 Ohno et al.
2018/0304550 A1 10/2018 Atherton et al.
2018/0322623 A1 11/2018 Memo et al.
2018/0341730 A1 11/2018 Atherton et al.
2019/0076949 A1 3/2019 Atherton et al.
2019/0108639 A1 4/2019 Tchapmi et al.
2019/0193180 A1 6/2019 Troyer et al.
2019/0240759 A1 8/2019 Ennsbrunner et al.
2019/0375101 A1 12/2019 Miyata et al.
2020/0014449 A1 1/2020 Kim et al.
2020/0021780 A1 1/2020 Jeong et al.
2020/0030984 A1 1/2020 Suzuki et al.
2020/0114449 A1* 4/2020 Chang .................. B23K 9/0956
2020/0130089 A1 4/2020 Ivkovich et al.
2020/0164521 A1 5/2020 Li et al.
2020/0180062 A1 6/2020 Suzuki et al.
2020/0223064 A1 7/2020 Zak
2020/0262079 A1 8/2020 Saez et al.
2020/0269340 A1 8/2020 Tang et al.
2020/0316779 A1 10/2020 Truebenbach et al.
2020/0409376 A1 12/2020 Ebrahimi et al.
2021/0012678 A1 1/2021 Torrecilla et al.
2021/0158724 A1 5/2021 Becker et al.
2021/0318673 A1 10/2021 Kitchen et al.
2022/0016776 A1 1/2022 Lonsberry et al.
2022/0226922 A1 7/2022 Albrecht et al.
2022/0250183 A1 8/2022 Knoener
2022/0258267 A1 8/2022 Becker
2022/0266453 A1 8/2022 Lonsberry et al.
2022/0305593 A1 9/2022 Lonsberry et al.
2022/0324110 A1 10/2022 Lonsberry et al.
2022/0402147 A1 12/2022 Martin et al.
2022/0410402 A1 12/2022 Lonsberry et al.
2023/0093558 A1 3/2023 Takeya et al.
2023/0123712 A1 4/2023 Lonsberry et al.
2023/0173676 A1 6/2023 Lonsberry et al.
2023/0260138 A1 8/2023 Becker et al.
2023/0278224 A1 9/2023 Bunker et al.
2023/0330764 A1 10/2023 Ott et al.
2024/0025041 A1 1/2024 Lonsberry et al.

FOREIGN PATENT DOCUMENTS

CN 110524581 A 12/2019
CN 111189393 A 5/2020
CN 113352317 A 9/2021
EP 1314510 A1 5/2003
EP 3812105 A1 4/2021
JP 2001328092 A 11/2001
JP 2006130522 A 5/2006
JP 2010269336 A 12/2010
JP 2015140171 A 8/2015
JP 223604 12/2015
JP 2015223604 A 12/2015
JP 2017196653 A 11/2017
JP 2021013947 A 2/2021
WO 1994003303 A1 11/2004
WO 2016013171 A1 1/2016
WO 2017115015 A1 7/2017
WO 2018173655 A1 9/2018
WO 2019153090 A1 8/2019

OTHER PUBLICATIONS

Bingul et al, A real-time prediction model of electrode extension for GMAW, IEEE/ASME Transaction on Mechatronics, vol. 11, No. 1, pp. 47-4, 2006.
Boulware, "A methodology for the robust procedure development of fillet welds", The Ohio State University Knowledge Bank, 2006.
Chandrasekaran, "Predication of bead geometry in gas metal arc welding by statistical regression analysis", University of Waterloo, 2019.
Devaraj et al., "Grey-based Taguchi multiobjective optimization and artificial intelligence-based prediction of dissimilar gas metal arc welding process performance", Metals, vol. 11, 1858, 2021.

(56) References Cited

OTHER PUBLICATIONS

Ding et al., A multi-bead overlapping model for robotic wire and arc additive manufacturing (WAAM), Robotics and Computer-Integrated Manufacturing, vol. 31, pp. 101-110, 20115.
Ding, et al., "Bead modelling and implementation of adaptive MAT path in wire and arc additive manufacturing", Robotics and Computer-Integrated Manufacturing, vol. 39, pp. 32-42, 2016.
Hao et al., "Effects of tilt angle between laser nozzle and substrate on bead morphology in multi-axis laser cladding", Journal of manufacturing processes, vol. 43, pp. 311-322, 2019.
Harwig, "A wise method for assessing arc welding performance and quality", Welding Journal, pp. 35-39, 2000.
Harwig, "Arc behaviour and metal transfer of the vp-gmaw process", School of Industrial and Manufacturing Science, 2003.
He et al., "Dynamic modeling of weld bead geometry features in thick plate GMAW based on machine vision and learning", Sensors, vol. 20, 7104, 2020.
Horvath et al., "Bead geometry modeling on uneven base metal surface by fuzzy C1 systems for multi-pass welding", Expert Systems with Applications, 186, 115356, 24 pages, 2021.
Hu et al., "Molten pool behaviors and forming appearance of robotic GMAW on complex surface with various welding positions", Journal of Manufacturing Processes, vol. 64, pp. 1359-1376, 2021.
Hu et al., "Multi-bead overlapping model with varying cross-section profile for robotic GMAW-based additive manufacturing", Journal of Intelligent Manufacturing, 2019.
International Application No. PCT/US2021/042218, filed Jul. 19, 2021, by Path Robotics, Inc.: International Search Report and Written Opinion, mailed Dec. 9, 2021, including Notification of Transmittal; 16 pages.
International Patent Application No. PCT/US2022/017741 International Search Report and Written Opinion, dated Jul. 25, 2022. (23 pages).
International Patent Application No. PCT/US2022/017741 Invitation to Pay Additional Fees and, Where Applicable, Protest Fee, dated May 23, 2022. (2 pages).
International Patent Application No. PCT/US2022/017744 International Search Report and Written Opinion, dated Jun. 14, 2022. (13 pages).
International Search Report and Written Opinion for International Application No. PCT/IB2022/061107, mailed Nov. 17, 2022, 19 pages.
International Search Report and Written Opinion issued in corresponding PCT Application No. PCT/US2023/019063, mailed Sep. 12, 2023.
Invitation to Pay Additional Fees and, Where Applicable, Protest Fee and Partial International Search Report issued in International Patent Application No. PCT/US2023/019063, dated Jul. 18, 2023, 11 pages.
Jing et al., "Rgb-d sensor-based auto path generation method for arc welding robot", 2016 Chinese Control and Decision Conference (CCDC), IEEE, 2016.
Kesse et al., "Development of an artificial intelligence powered TIG welding algorithm for the prediction of bead geometry for TIG welding processes using hybrid deep learning", Metals, vol. 10, 451, 2020.
Kiran et al., "Arc interaction and molten pool behavior in the three wire submerged arc welding process", International Journal of Heat and Mass Transfer, vol. 87, pp. 327-340, 2015.
Kolahan et al., A new approach for predicting and optimizing weld bead geometry in GMAW, World Academy of Science, Engineering and Technology, vol. 59, pp. 138-141, 2009.
Larkin et al., "Automatic program generation for welding robots from CAD", IEEE International Conference on Advanced Intelligent Mechatronics(AIM), IEEE, pp. 560-565, 2016.
Li et al., "Enhanced beads overlapping model for wire and arc additive manufacturing of multi-layer multi-bead metallic parts", Journal of Materials Processing Technology, 2017.
Li et al., "GMAW-based additive manufacturing of inclined multi-layer multi-bead parts with flat-position deposition", Journal of Materials Processing Tech, vol. 262, pp. 359-371, 2018.
Liu et al., "Motion navigation for arc welding robots based on feature mapping in a simulation environment", Robotics and Computer-Integrated Manufacturing, 26(2); pp. 137-144, 2010.
Lv et al., "Levenberg-marquardt backpropagation training of multilayer neural networks for state estimation of a safety critical cyber-physical system", IEEE Transactions on Industrial Informatics, 14(8), pp. 3436-3446.
Lynch, K.M. et al., "Robot Control", Modern Robotics: Mechanics, Planning, and Control, Cambridge University Press, 2017, 403-460.
Martinez et al., "Two gas metal arc welding process dataset of arc parameters and input parameters", Data in Brief, vol. 35, 106790, 2021.
Mollayi et al., "Application of multiple kernel support vector regression for weld bead geometry prediction in robotic GMAW Process", International Journal of Electrical and Computer Engineering, vol. 8, No. pp. 2310-2318, 2018.
Moos et al., "Resistance Spot Welding Process Simulation for Variational Analysis on Compliant Assemblies", Journal of Manufacturing Systems, Dec. 16, 2014, pp. 44-71.
Munro, "An empirical model for overlapping bead geometry during laser consolidation", Defence Research and Development Canada, 2019.
Murray, "Selecting parameters for GMAW using dimensional analysis", Welding Research, pp. 152s-131s, 2002.
Natarajan, S. et al., "Aiding Grasp Synthesis for Novel Objects Using Heuristic-Based and Data-Driven Active Vision Methods", Frontiers in Robotics and AI, 8:696587, 2021.
Nguyen et al., "Multi-bead overlapping models for tool path generation in wire-arc additive manufacturing processes", Procedia Manufacturing, vol. 47, pp. 1123-1128, 2020.
Rao et al., "Effect of process parameters and mathematical model for the prediction of bead geometry in pulsed GMA welding", The International Journal of Advanced Manufacturing Technology, vol. 45, pp. 496-05, 2009.
Ravichandran et al., "Parameter optimization of gas metal arc welding process on AISI: 430Stainless steel using meta heuristic optimization techniques", Department of Mechatronics Engineering.
Sheng et al., "A new adaptive trust region algorithm for optimization problems", Acta Mathematica Scientia, vol. 38b, No. 2., pp. 479-496, 2018.
Suryakumar et al., "Weld bead modeling and process optimization in hybrid layered manufacturing", Computer-Aided Design, vol. 43, pp. 331-344, 2011.
Thao, et al., "Interaction model for predicting bead geometry for lab joint in GMA welding process", Computational Materials Science and Surface Engineering, vol. 1, issue. 4., pp. 237-244, 2009.
Xiao, R. et al., "An adaptive feature extraction algorithm for multiple typical seam tracking based on vision sensor in robotic arc welding" Sensors and Actuators A: Physical, 297:111533, 15 pages, 2019.
Xiong et al., "Modeling of bead section profile and overlapping beads with experimental validation for robotic GMAW-based rapid manufacturing", Robotics and Computer-Integrated Manufacturing, vol. 29, pp. 417-423, 2013.
Hong, B. et al., "Online Extraction of Pose Information of 3D Zigzag Line Welding Seams for Welding Seam Tracking," Sensors 2021, 21, 375. https://doi.org/10.3390/s21020375.
Kuss, A. et al., "Automated planning of robotic MAG welding based on adaptive gap model," Elsevier: Procedia CIRP 62 (2017) 612-617.
Larkin, N. et al., "3D Mapping using a ToF Camera for Self Programming an Industrial Robot," 2013 IEEE/ASME International Conference on Advanced Intelligent Mechatronics (AIM) Wollongong, Australia, Jul. 9-12, 2013; pp. 494-499.
Order Granting Request for Ex Parte Reexamination mailed on Aug. 14, 2025 in U.S. Appl. No. 90/015,335, filed Jun. 18, 2025; 18 pages.

(56) References Cited

OTHER PUBLICATIONS

Rout, A. et al., "Advances in weld seam tracking techniques for robotic welding: A review," Elsevier: Robotics and Computer Integrated Manufacturing 56 (2018) 12-37.
Zhang, L. et al., "Weld Line Detection and Tracking via Spatial Temporal Cascaded Hidden Markov Models and Cross Structured Light", IEEE Transactions on Instrumentation and Measurement, IEEE, USA, vol. 63, No. 4, Apr. 1, 2014 (Apr. 1, 2014), pp. 742-753.
Zou, Y. et al., "Robust seam tracking via a deep learning framework combining tracking and detection", Applied Optics, vol. 59, No. 14, May 10, 2020 (May 10, 2020), p. 4321.
Zych, A. "Programming of Welding Robots in Shipbuilding," Procedia CIRP 99 (2021) 478-483.

* cited by examiner

900

902 OBTAINING IMAGE DATA OF A WORKSPACE

↓

904 IDENTIFYING POINTS ON A PART TO BE WELDED

↓

906 IDENTIFYING A CANDIDATE SEAM

↓

908 GENERATING WELDING INSTRUCTIONS FOR A WELDING ROBOT

AUTONOMOUS WELDING ROBOTS

CROSS-REFERENCE TO RELATED APPLICATIONS

This application is a continuation of U.S. patent application Ser. No. 18/469,506 filed Sep. 18, 2023, entitled "AUTONOMOUS WELDING ROBOTS," which is a continuation of U.S. patent application Ser. No. 17/902,748 filed Sep. 2, 2022, entitled AUTONOMOUS WELDING ROBOTS," now U.S. Pat. No. 11,801,606, issued Oct. 31, 2023, which is a continuation of U.S. patent application Ser. No. 17/680,027 filed Feb. 24, 2022, entitled "AUTONOMOUS WELDING ROBOTS." now U.S. Pat. No. 11,548, 162 issued Jan. 10, 2023, which claims the benefit of U.S. provisional patent application Ser. No. 63/153,109 filed Feb. 24, 2021, entitled "SYSTEMS AND METHODS FOR OPERATING AND CONTROLLING A WELDING ROBOT," and U.S. provisional patent application Ser. No. 63/282,827 filed Nov. 24, 2021, entitled "SYSTEMS AND METHODS FOR OPERATING AND CONTROLLING A WELDING ROBOT," the entire contents of each being incorporated herein by reference for all purposes.

BACKGROUND

Robotic manufacturing entails the use of robots to perform one or more aspects of a manufacturing process. Robotic welding is one application in the field of robotic manufacturing. In robotic welding, robots weld two or more components together along one or more seams. Because such robots automate processes that would otherwise be performed by humans or by machines directly controlled by humans, they provide significant benefits in production time, reliability, efficiency, and costs.

SUMMARY

In various examples, a computer-implemented method of generating instructions for a welding robot. The computer-implemented method comprises identifying an expected position and expected orientation of a candidate seam on a part to be welded based on a Computer Aided Design (CAD) model of the part, scanning a workspace containing the part to produce a representation of the part, identifying the candidate seam on the part based on the representation of the part and the expected position and expected orientation of the candidate seam, determining an actual position and actual orientation of the candidate seam, and generating welding instructions for the welding robot based at least in part on the actual position and actual orientation of the candidate seam.

In examples, a computer-implemented method of generating welding instructions for a welding robot. The method comprises obtaining, via a sensor, image data of a workspace that includes a part to be welded, identifying a plurality of points on the part to be welded based on the image data, identifying a candidate seam on the part to be welded from the plurality of points, and generating welding instructions for the welding robot based at least in part on the identification of the candidate seam.

DETAILED DESCRIPTION

Figure 1:
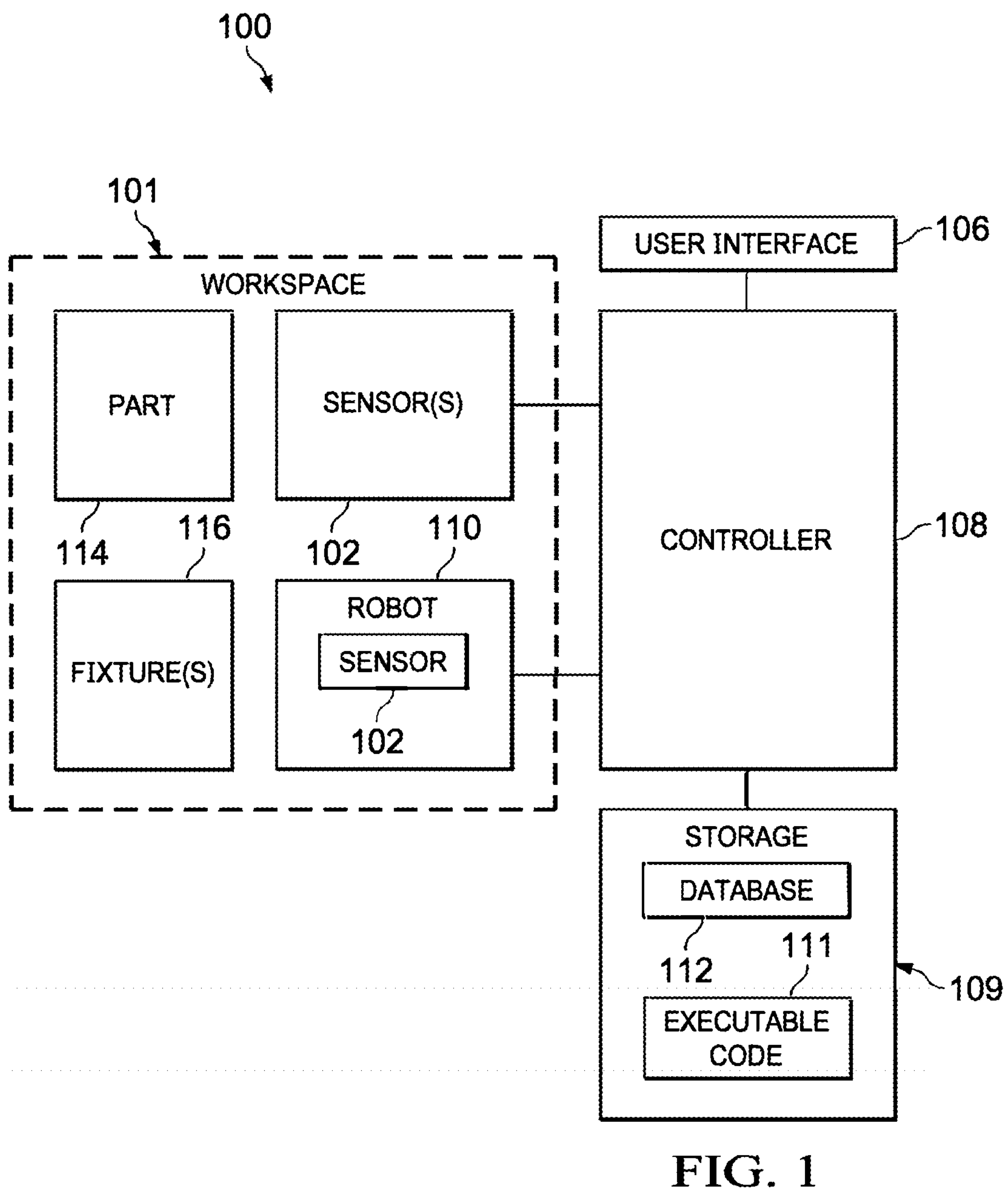
FIG. 1 is a block diagram of an autonomous robotic welding system, in accordance with various examples.

Conventional welding techniques are tedious, labor-intensive, and inefficient. Conventional welding techniques are also not adequately flexible to accommodate irregularities that are commonly encountered during manufacturing processes, leading to undesirable downtime and inefficiencies. For example, in conventional welding techniques, a skilled programmer must generate instructions by which a welding robot performs welding operations. These instructions instruct the welding robot as to the motion, path, trajectory, and welding parameters that must be used to perform a particular welding operation. The instructions are written under the assumption that a high-volume operation is to be performed in which the same welding operation is repeated many times. Thus, any aberrations encountered during the welding process (e.g., a different part) can result in misplaced welds. Misplaced welds, in turn, increase inefficiencies, costs, and other negative aspects of volume production.

In some instances, a computer-aided-design (CAD) model of parts may be useful to a welding robot to facilitate welding operations. For example, a CAD model of a part to be welded may be provided to a welding robot, and the welding robot may use the CAD model to guide its movements, such as the location of a seam to be welded. The seam(s) to be welded are annotated (e.g., annotations that include user-selected edges, where each edge represents a seam) in the CAD model and the welding robot, after locating a seam using sensors, lays weld according to the annotations. Although such approaches may reduce or eliminate the need for a skilled programmer or manufacturing engineer, they have limitations. For instance, welding operations are very precise operations. Generally, in order to create an acceptable weld, it is desirable for the weld tip to be located within I mm from a target position associated with a seam. When guiding a welding robot based on a CAD model, actual seams may be more than I mm from the modeled location even when the part closely conforms to the CAD model, which can make it difficult or impossible for the weld tip to be accurately positioned to create an acceptable weld. In instances in which the CAD model is a simplification of the actual part (which is common in low-volume production), the seam may be removed from the modeled location by one or more centimeters. Therefore, using known techniques, locating a seam precisely based on a CAD model can be challenging. Accordingly, the welding robot may create unacceptable welds, thereby creating defective parts.

Furthermore, prior solutions for controlling welding robots require a skilled operator to provide specific instructions to the welding robot to avoid collisions with other components (e.g., parts, sensors, clamps, etc.) as the welding robot (and, more specifically, the robot arm) moves within the manufacturing workspace along a path from a first point to a second point, such as a seam. Identifying a path (e.g., a path that the robot may follow to weld a seam) free from obstructions and collisions is referred to herein as path planning. Requiring a skilled operator to perform path planning for dozens or even hundreds of potential pathways for a robot arm is inefficient, tedious, and costly. Furthermore, conventional welding robots are often programmed to follow the same path, same motion, and same trajectory, repeatedly. This repeatedly performed process may be acceptable in a high-volume manufacturing setting where the manufacturing process is highly matured, but in low- or medium-volume settings, a component may be placed in an unexpected position relative to the welding robot, which may lead to collisions, misaligned parts, poor tolerances, and other problems. Accordingly, in certain settings, a skilled operator may be needed to facilitate welding.

The welding technology described herein is superior to prior welding robots and techniques because it can automatically and dynamically generate instructions useful to a welding robot to precisely and accurately identify and weld seams. Unlike prior systems and techniques, the welding technology described herein does not necessarily require CAD models of parts to be welded (although, in some examples and as described below, CAD models may be useful), nor does it necessarily require any other a priori information about the parts or the manufacturing workspace. Rather, the welding technology described herein uses movable sensors to map the manufacturing workspace (and in particular, parts and seams) in three-dimensional (3D) space, and it uses such maps to locate and weld seams with a high degree of accuracy and precision. The welding technology described herein includes various additional features that further distinguish it from prior, inferior solutions, such as the ability to identify multiple candidate seams for welding, the ability to interact with a user to select a candidate seam for welding, and the ability to dynamically change welding parameters and provide feedback on welding operations, among others. Furthermore, the welding technology described herein is configured to use data acquired by the sensors to automatically and dynamically perform path planning—that is, to automatically and dynamically identify, without a priori information, one or more paths in the manufacturing workspace along which the robot arm may travel free from collisions with other components. The welding technology described herein is also configured to use a combination of the data acquired by the sensors and a priori information (e.g., annotated CAD model) to dynamically perform path planning and welding. These and other examples are now described below with reference to the drawings.

FIG. 1 is a block diagram of an autonomous robotic welding system 100, in accordance with various examples. The system 100 includes a manufacturing workspace 101, a user interface 106, a controller 108, and storage 109 storing a database 112. The system 100 may include other components or subsystems that are not expressly described herein. The manufacturing workspace 101 is an area or enclosure within which a robot arm(s) operates on one or more parts that are positioned on, coupled to, or otherwise supported by a platform or positioner while being aided by information received by way of one or more sensors. In examples, the workspace 101 can be any suitable welding area designed with appropriate safety measures for welding. For example, workspace 101 can be a welding area located in a workshop, job shop, manufacturing plant, fabrication shop, and/or the like. In examples, the manufacturing workspace 101 (or, more generally, workspace 101) may include sensors 102, a robot 110 that is configured to perform welding-type processes such as welding, brazing, and bonding, a part 114 to be welded (e.g., a part having a seam), and a fixture 116. The fixture 116 may hold, position, and/or manipulate the part 114 and may be, for example, clamps, platforms, positioners, or other types of fixtures. The fixture 116 may be configured to securely hold the part 114. In examples, the fixture 116 is adjustable, either manually by a user or automatically by a motor. For instance, the fixture 116 may dynamically adjust its position, orientation, or other physical configuration prior to or during a welding process. In some examples, the robot 110 may include one or more sensors 102. For instance, one or more sensors 102 may be positioned on an arm (e.g., on a weld head attached to the arm) of the robot 110. In another example, one or more sensors 102 may be positioned on a movable, non-welding robot arm (which may be different from the robot 110). In yet another example, one of the one or more sensors 102 may be positioned on the arm of the robot 110 and another one of the one or more sensors 102 may be positioned on a movable equipment in the workspace. In yet another example, one of the one or more sensors 102 may be positioned on the arm of the robot 110 and another one of the one or more sensors 102 may be positioned on a movable, non-welding robot arm.

The sensors 102 are configured to capture information about the workspace 101. In examples, the sensors 102 are image sensors that are configured to capture visual information (e.g., two-dimensional (2D) images) about the workspace 101. For instance, the sensors 102 may include cameras (e.g., cameras with built-in laser), scanners (e.g., laser scanners), etc. The sensors 102 may include sensors such as Light Detection and Ranging (LiDAR) sensors. Alternatively or in addition, the sensors 102 may be audio sensors configured to emit and/or capture sound, such as Sound Navigation and Ranging (SONAR) devices. Alternatively or in addition, the sensors 102 may be electromagnetic sensors configured to emit and/or capture electromagnetic (EM) waves, such as Radio Detection and Ranging (RADAR) devices. Through visual, audio, electromagnetic, and/or other sensing technologies, the sensors 102 may collect information about physical structures in the workspace 101. In examples, the sensors 102 collect static information (e.g., stationary structures in the workspace 101), and in other examples, the sensors 102 collect dynamic information (e.g., moving structures in the workspace 101), and in still other examples, the sensors 102 collect a combination of static and dynamic information. The sensors 102 may collect any suitable combination of any and all such information about the physical structures in the workspace 101 and may provide such information to other components (e.g., the controller 108) to generate a 3D representation of the physical structures in the workspace 101. As described above, the sensors 102 may capture and communicate any of a variety of information types, but this description assumes that the sensors 102 primarily capture visual information (e.g., 2D images) of the workspace 101, which are subsequently used en masse to generate 3D representations of the workspace 101 as described below.

To generate 3D representations of the workspace 101, the sensors 102 capture 2D images of physical structures in the workspace 101 from a variety of angles. For example, although a single 2D image of a fixture 116 or a part 114 may be inadequate to generate a 3D representation of that component, and, similarly, a set of multiple 2D images of the fixture 116 or the part 114 from a single angle, view, or plane may be inadequate to generate a 3D representation of that component, multiple 2D images captured from multiple angles in a variety of positions within the workspace 101 may be adequate to generate a 3D representation of a component, such as a fixture 116 or part 114. This is because capturing 2D images in multiple orientations provides spatial information about a component in three dimensions, similar in concept to the manner in which plan drawings of a component that include frontal, profile, and top-down views of the component provide all information necessary to generate a 3D representation of that component. Accordingly, in examples, the sensors 102 are configured to move about the workspace 101 so as to capture information adequate to generate 3D representations of structures within the workspace 101. In examples, the sensors are stationary but are present in adequate numbers and in adequately varied locations around the workspace 101 such that adequate information is captured by the sensors 102 to generate the aforementioned 3D representations. In examples where the sensors 102 are mobile, any suitable structures may be useful to facilitate such movement about the workspace 101. For example, one or more sensors 102 may be positioned on a motorized track system. The track system itself may be stationary while the sensors 102 are configured to move about the workspace 101 on the track system. In some examples, however, the sensors 102 are mobile on the track system and the track system itself is mobile around the workspace 101. In still other examples, one or more mirrors are arranged within the workspace 101 in conjunction with sensors 102 that may pivot, swivel, rotate, or translate about and/or along points or axes such that the sensors 102 capture 2D images from initial vantage points when in a first configuration and, when in a second configuration, capture 2D images from other vantage points using the mirrors. In yet other examples, the sensors 102 may be suspended on arms that may be configured to pivot, swivel, rotate, or translate about and/or along points or axes, and the sensors 102 may be configured to capture 2D images from a variety of vantage points as these arms extend through their full ranges of motion.

Additionally, or alternatively, one or more sensors 102 may be positioned on the robot 110 (e.g., on a weld head of the robot 110) and may be configured to collect image data as the robot 110 moves about the workspace 101. Because the robot 110 is mobile with multiple degrees of freedom and therefore in multiple dimensions, sensors 102 positioned on the robot 110 may capture 2D images from a variety of vantage points. In yet other examples, one or more sensors 102 may be stationary while physical structures to be imaged are moved about or within the workspace 101. For instance, a part 114 to be imaged may be positioned on a fixture 116 such as a positioner, and the positioner and/or the part 114 may rotate, translate (e.g., in x-, y-, and/or z-directions), or otherwise move within the workspace 101 while a stationary sensor 102 (e.g., either the one coupled to the robot 110 or the one decoupled from the robot 110) captures multiple 2D images of various facets of the part 114.

In some examples, some or all of the aforementioned sensor 102 configurations are implemented. Other sensor 102 configurations are contemplated and included in the scope of this disclosure.

Referring still to FIG. 1, the robot 110 (e.g., a weld head of the robot 110) is configured to move within the workspace 101 according to a path plan received from the controller 108 as described below. The robot 110 is further configured to perform one or more suitable manufacturing processes (e.g., welding operations) on the part 114 in accordance with instructions received from the controller 108. In some examples, the robot 110 can be a six-axis robot with a welding arm. The robot 110 can be any suitable robotic welding equipment such as YASKAWA® robotic arms, ABB® IRB robots, KUKA® robots, and/or the like. The robot 110 can be configured to perform arc welding, resistance welding, spot welding, tungsten inert gas (TIG) welding, metal active gas (MAG) welding, metal inert gas (MIG) welding, laser welding, plasma welding, a combination thereof, and/or the like.

Referring still to FIG. 1, the workspace 101, and specifically the sensor(s) 102 and the robot 110 within the workspace 101, are coupled to the controller 108. The controller 108 is any suitable machine that is specifically and specially configured (e.g., programmed) to perform the actions attributed herein to the controller 108, or, more generally, to the system 100. In some examples, the controller 108 is not a general purpose computer and instead is specially programmed and/or hardware-configured to perform the actions attributed herein to the controller 108, or, more generally, to the system 100. In some examples, the controller 108 is or includes an application-specific integrated circuit (ASIC) configured to perform the actions attributed herein to the controller 108, or, more generally, to the system 100. In some examples, the controller 108 includes or is a processor, such as a central processing unit (CPU). In some examples, the controller 108 is a field programmable gate array (FPGA). In examples, the controller 108 includes memory storing executable code, which, when executed by the controller 108, causes the controller 108 to perform one or more of the actions attributed herein to the controller 108, or, more generally, to the system 100. The controller 108 is not limited to the specific examples described herein.

The controller 108 controls the sensor(s) 102 and the robot 110 within the workspace 101. In some examples, the controller 108 controls the fixture(s) 116 within the workspace 101. For example, the controller 108 may control the sensor(s) 102 to move within the workspace 101 as described above and/or to capture 2D images, audio data, and/or EM data as described above. For example, the controller 108 may control the robot 110 as described herein to perform welding operations and to move within the workspace 101 according to a path planning technique as described below. For example, the controller 108 may manipulate the fixture(s) 116, such as a positioner (e.g., platform, clamps, etc.), to rotate, translate, or otherwise move one or more parts within the workspace 101. The controller 108 may also control other aspects of the system 100. For example, the controller 108 may further interact with the user interface (UI) 106 by providing a graphical interface on the UI 106 by which a user may interact with the system 100 and provide inputs to the system 100 and by which the controller 108 may interact with the user, such as by providing and/or receiving various types of information to and/or from a user (e.g., identified seams that are candidates for welding, possible paths during path planning, welding parameter options or selections, etc.). The UI 106 may be any type of interface, including a touchscreen interface, a voice-activated interface, a keypad interface, a combination thereof, etc.

Furthermore, the controller 108 may interact with the database 112, for example, by storing data to the database 112 and/or retrieving data from the database 112. The database 112 may more generally be stored in any suitable type of storage 109 that is configured to store any and all types of information. In some examples, the database 112 can be stored in storage 109 such as a random access memory (RAM), a memory buffer, a hard drive, an erasable programmable read-only memory (EPROM), an electrically erasable read-only memory (EEPROM), a read-only memory (ROM), Flash memory, and the like. In some examples, the database 112 may be stored on a cloud-based platform. The database 112 may store any information useful to the system 100 in performing welding operations. For example, the database 112 may store a CAD model of the part 114. As another example, the database 112 may store an annotated version of a CAD model of the part 114. The database 112 may also store a point cloud of the part 114 generated using the CAD model (also herein referred to as CAD model point cloud). Similarly, welding instructions for the part 114 that are generated based on 3D representations of the part 114 and/or on user input provided regarding the part 114 (e.g., regarding which seams of the part 114 to weld, welding parameters, etc.) may be stored in the database 112. In examples, the storage 109 stores executable code 111, which, when executed, causes the controller 108 to perform one or more actions attributed herein to the controller 108, or, more generally, to the system 100. In examples, the executable code 111 is a single, self-contained, program, and in other examples, the executable code is a program having one or more function calls to other executable code which may be stored in storage 109 or elsewhere. In some examples, one or more functions attributed to execution of the executable code 111 may be implemented by hardware. For instance, multiple processors may be useful to perform one or more discrete tasks of the executable code 111.

Figure 2:
FIG. 2 is a schematic diagram of an autonomous robotic welding system, in accordance with various examples.
Figure 2:
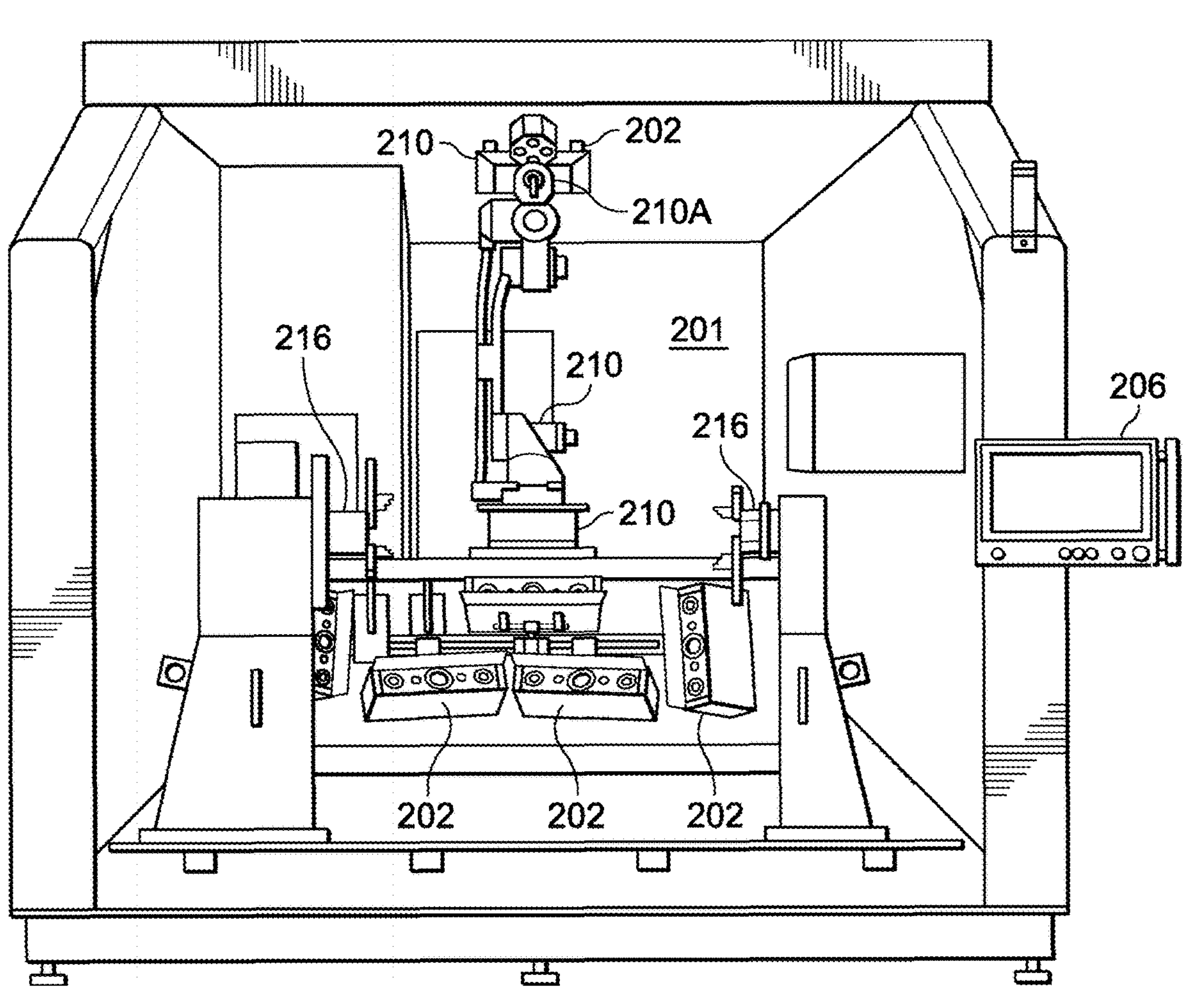

FIG. 2 is a schematic diagram of an illustrated autonomous robotic welding system 200, in accordance with various examples. The system 200 is an example of the system 100 of FIG. 1, with like numerals referring to like components. For example, the system 200 includes a workspace 201. The workspace 201, in turn, includes optionally movable sensors 202, a robot 210 (which may include one or more sensors 202 (in addition to movable sensors 202) mounted thereupon), and fixtures 216. The robot 210 includes multiple joints and members (e.g., shoulder, arm, elbow, etc.) that enable the robot 210 to move in any suitable number of degrees of freedom. The robot 210 includes a weld head 210A that performs welding operations on a part, for example, a part that may be supported by fixtures 216 (e.g., clamps). The system 200 further includes a UI 206 coupled to the workspace 201. In operation, the sensors 202 collect 2D images of the workspace 201 and provide the 2D images to a controller (not expressly shown in FIG. 2). The controller generates 3D representations (e.g., point clouds) of the workspace 201, such as the fixtures 216, a part supported by the fixtures 216, and/or other structures within the workspace 201. The controller uses the 3D representations to identify a seam (e.g., on a part supported by the fixtures 216), to plan a path for welding the seam without the robot 210 colliding with structures within the workspace 201, and to control the robot 210 to weld the seam, as described herein.

Figure 3:
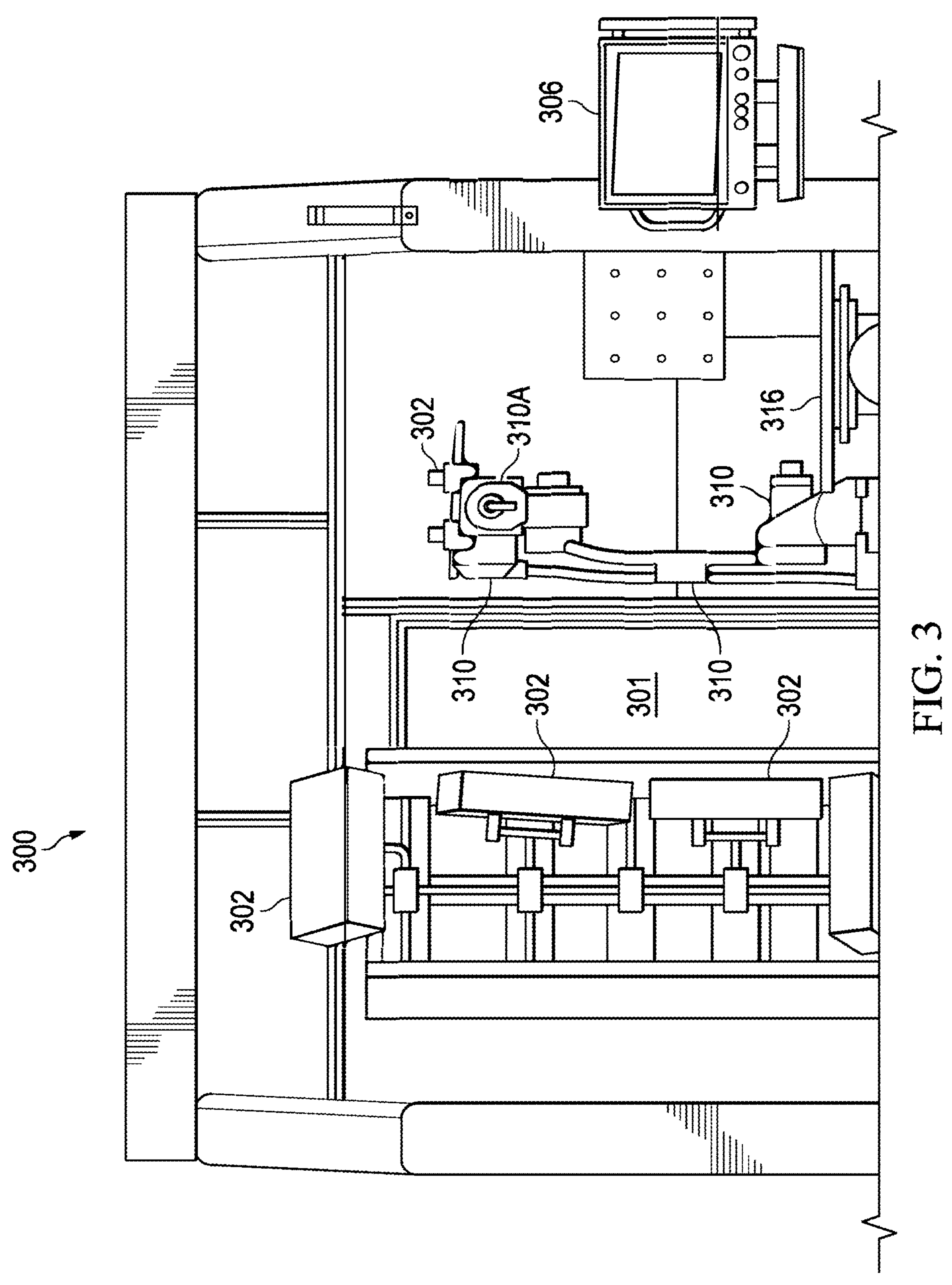
FIG. 3 is a schematic diagram of an autonomous robotic welding system, in accordance with various examples.

FIG. 3 is a schematic diagram of an autonomous robotic welding system 300, in accordance with various examples. The system 300 is an example of the system 100 of FIG. 1 and the system 200 of FIG. 2, with like numerals referring to like components. For example, the system 300 includes a workspace 301. The workspace 301, in turn, includes optionally movable sensors 302, a robot 310 (which may include one or more sensors 302 mounted thereupon), and fixtures 316 (e.g., a platform or positioner). The robot 310 includes multiple joints and members (e.g., shoulder, arm, elbow, etc.) that enable the robot 310 to move in any suitable number of degrees of freedom. The robot 310 includes a weld head 310A that performs welding operations on a part, for example, a part that may be supported by fixtures 316. The system 300 further includes a UI 306 coupled to the workspace 301. In operation, the sensors 302 collect2D images of the workspace 301 and provide the 2D images to a controller (not expressly shown in FIG. 3). The controller generates 3D representations (e.g., point clouds) of the workspace 301, such as the fixtures 316, a part supported by the fixtures 316, and/or other structures within the workspace 301. The controller uses the 3D representations to identify a seam (e.g., on a part supported by the fixtures 316), to plan a path for welding the seam without the robot 310 colliding with structures within the workspace 301, and to control the robot 310 to weld the seam, as described herein.

Referring again to FIG. 1, and as described above, the controller 108 is configured to receive 2D images (and, possibly, other data, such as audio data or EM data) from the sensors 102 and to generate 3D representations of the structures depicted in the 2D images. The 3D representations may be referred to as point clouds. A point cloud can be a set of points each of which represents a location in 3D space of a point on a surface of the parts 114 and/or the fixtures 116. In some examples, one or more 2D images (e.g., image data captured by the sensor(s) 102 at a particular orientation relative to part 114) may be overlapped and/or stitched together by the controller 108 to reconstruct and generate 3D image data of the workspace 101. The 3D image data can be collated to generate the point cloud with associated image data for at least some points in the point cloud.

In examples, the 3D image data can be collated by the controller 108 in a manner such that the point cloud generated from the data can have six degrees of freedom. For instance, each point in the point cloud may represent an infinitesimally small position in 3D space. As described above, the sensor(s) 102 can capture multiple 2D images of the point from various angles. These multiple 2D images can be collated by the controller 108 to determine an average image pixel for each point. The averaged image pixel can be attached to the point. For example, if the sensor(s) 102 are color cameras having red, green, and blue channels, then the six degrees of freedom can be {x-position, y-position, z-position, red-intensity, green-intensity, and blue-intensity}. If, for example, the sensor(s) 102 are black and white cameras with black and white channels, then four degrees of freedom may be generated.

Figure 4:
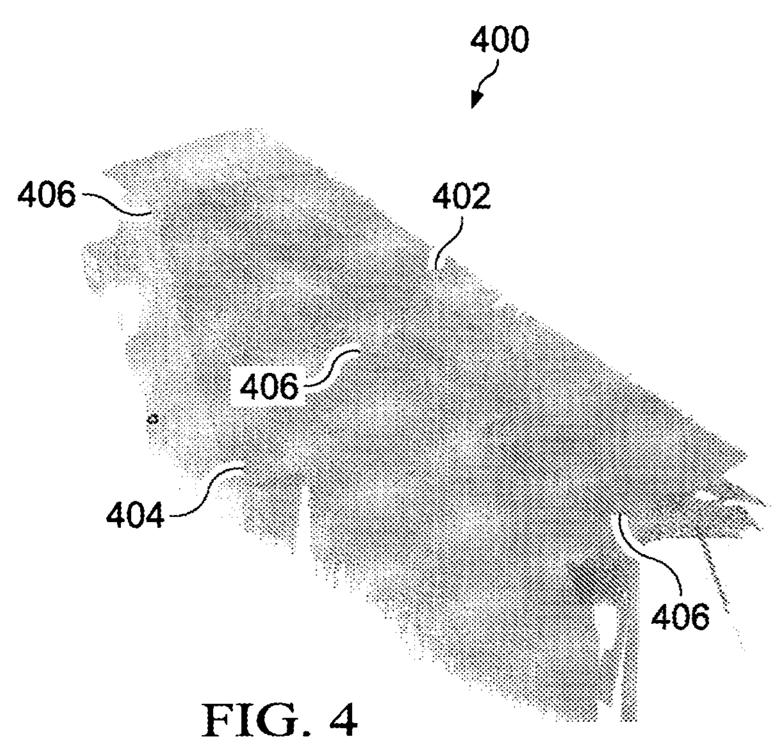
FIG. 4 is an illustrative point cloud of parts having a weldable seam, in accordance with various examples.
Figure 5:
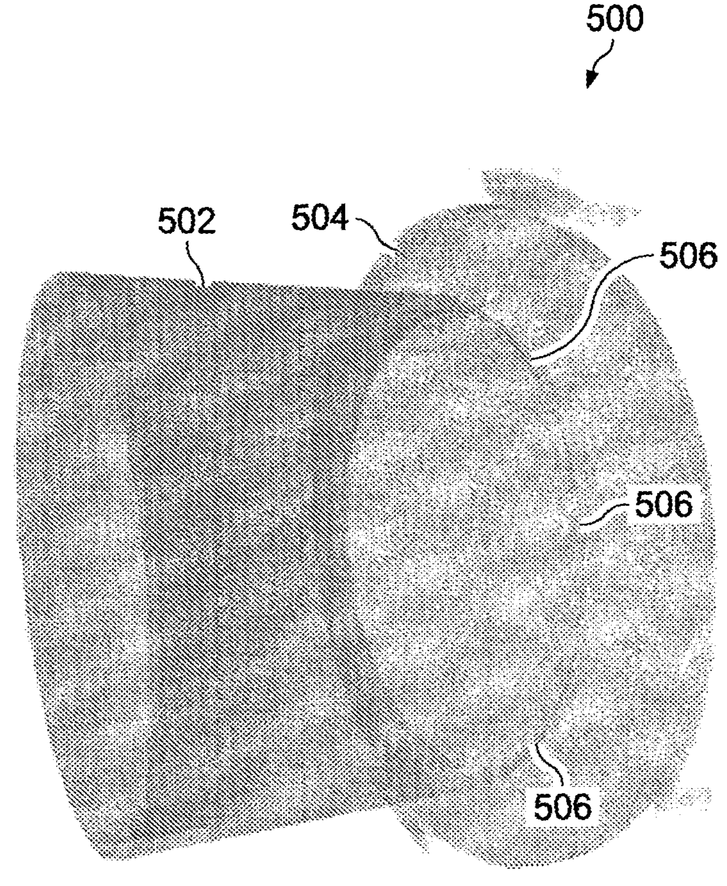
FIG. 5 is an illustrative point cloud of parts having a weldable seam, in accordance with various examples.

FIG. 4 is an illustrative point cloud 400 of parts having a weldable seam, in accordance with various examples. More specifically, point cloud 400 represents a part 402 and a part 404 to be welded together along seam 406. FIG. 5 is an illustrative point cloud 500 of parts having a weldable seam, in accordance with various examples. More specifically, point cloud 500 represents a part 502 and a part 504 to be welded together along seam 506. The controller 108 (FIG. 1) is configured to generate the 3D point clouds 400, 500 based on 2D images captured by the sensors 102, as described above. The controller 108 may then use the point clouds 400, 500 (or, in some examples, image data useful to generate the point clouds 400, 500) to identify and locate seams, such as the seams 406, 506, to plan a welding path along the seams 406, 506, and to lay welds along the seams 406, 506 according to the path plan and using the robot 110 (FIG. 1). The manner in which the controller 108 executes the executable code 111 (FIG. 1) to perform such operations—including seam identification and path planning—is now described in detail.

The controller 108, upon executing the executable code 111, uses a neural network to perform a pixel-wise (e.g., using images captured by or based on the images captured by sensors 102) and/or point-wise (e.g., using one or more point clouds) classification to identify and classify structures within the workspace 101. For example, the controller 108 may perform a pixel-wise and/or point-wise classification to identify each imaged structure within the workspace 101 as a part 114, as a seam on the part 114 or at an interface between multiple parts 114 (referred to herein as candidate seams), as a fixture 116, as the robot 110, etc. The controller 108 may identify and classify pixels and/or points based on a neural network (e.g., a U-net model) trained using appropriate training data, in examples. The neural network can be trained on image data, point cloud data, spatial information data, or a combination thereof. Because the point cloud and/or the image data includes information captured from various vantage points within the workspace 101, the neural network can be operable to classify the fixtures 116 or the candidate seams on the part(s) 114 from multiple angles and/or viewpoints. In some examples, a neural network can be trained to operate on a set of points directly, for example a dynamic graph convolutional neural network, and the neural network may be implemented to analyze unorganized points on the point cloud. In some examples, a first neural network can be trained on point cloud data to perform point-wise classification and a second neural network can be trained on image data to perform pixel-wise classification. The first neural network and the second neural network can individually identify candidate seams and localize candidate seams. The output from the first neural network and the second neural network can be combined as a final output to determine the location and orientation of one or more candidate seams on a part 114.

In some examples, if pixel-wise classification is performed, the results can be projected onto 3D point cloud data and/or a meshed version of the point cloud data, thereby providing information on a location of the fixture 116 in the workspace 101. If the input data is image data (e.g., color images), spatial information such as depth information may be included along with color data in order to perform pixel-wise segmentation. In some examples, pixel-wise classification can be performed to identify candidate seams and localize candidate seams relative to a part 114 as further described below.

As described above, the controller 108 may identify and classify pixels and/or points as specific structures within the workspace 101, such as fixtures 116, part 114, candidate seams of the part 114, etc. Portions of the image and/or point cloud data classified as non-part and non-candidate seam structures, such as fixtures 116, may be segmented out (e.g., redacted or otherwise removed) from the data, thereby isolating data identified and classified as corresponding to a part 114 and/or candidate seam(s) on the part 114. In some examples, after identifying the candidate seams and segmenting the non-part 114 and non-candidate seam data as described above (or, optionally, prior to such segmentation), the neural network can be configured to analyze each candidate seam to determine the type of seam. For example, the neural network can be configured to determine whether the candidate seam is a butt joint, a corner joint, an edge joint, a lap joint, a tee joint, or the like. The model (e.g., a U-net model) may classify the type of seam based on data captured from multiple vantage points within the workspace 101.

If pixel-wise classification is performed using image data, the controller 108 may project the pixels of interest (e.g., pixels representing parts 114 and candidate seams on the parts 114) onto a 3D space to generate a set of 3D points representing the parts 114 and candidate seams on the parts 114. Alternatively, if point-wise classification is performed using point cloud data, the points of interest may already exist in 3D space in the point cloud. In either case, to the controller 108, the 3D points are an unordered set of points and at least some of the 3D points may be clumped together. To eliminate such noise and generate a continuous and contiguous subset of points to represent the candidate seams, a Manifold Blurring and Mean Shift (MBMS) technique or similar techniques may be applied. Such techniques may condense the points and eliminate noise. Subsequently, the controller 108 may apply a clustering method to break down the candidate seams into individual candidate seams. Stated another way, instead of having several subsets of points representing multiple seams, clustering can break down each subset of points into individual seams. Following clustering, the controller 108 may fit a spline to each individual subset of points. Accordingly, each individual subset of points can be an individual candidate seam.

To summarize, and without limitation, using the techniques described above, the controller 108 receives image data captured by the sensors 102 from various locations and vantage points within the workspace 101. The controller 108 performs a pixel-wise and/or point-wise classification technique using a neural network to classify and identify each pixel and/or point as a part 114, a candidate seam on a part 114 or at an interface between multiple parts 114, a fixture 116, etc. Structures identified as being non-part 114 structures and non-candidate seam structures are segmented out, and the controller 108 may perform additional processing on the remaining points (e.g., to mitigate noise). By performing these actions, the controller 108 may produce a set of candidate seams on parts 114 that indicate locations and orientations of those seams. As is now described, the controller 108 may then determine whether the candidate seams are actually seams and may optionally perform additional processing using a priori information, such as CAD models of the parts and seams. The resulting data is suitable for use by the controller 108 to plan a path for laying weld along the identified seams, as is also described below.

In some instances, the identified candidate seams may not be seams (i.e., the identified candidate seams may be false positives). To determine whether the identified candidate seams are actually seams, the controller 108 uses the images captured by sensors 102 from various vantage points inside the workspace 101 to determine a confidence value. The confidence value represents the likelihood whether the candidate seam determined from the corresponding vantage point is an actual seam. The controller 108 may then compare the confidence values for the different vantage points and eliminate candidate seams that are unlikely to be actual seams. For example, the controller 108 may determine a mean, median, maximum, or any other suitable summary statistic of the candidate values associated with a specific candidate seam. Generally, a candidate seam that corresponds to an actual seam will have consistently high (e.g., above a threshold) confidence values across the various vantage points used to capture that candidate seam. If the summary statistic of the confidence values for a candidate seam is above a threshold value, the controller 108 can designate the candidate seam as an actual seam. Conversely, if the summary statistic of the confidence values for a candidate seam is below a threshold value, the candidate seam can be designated as a false positive that is not eligible for welding.

As mentioned above, after identifying the candidate seams that are actually seams, the controller 108 may perform additional processing referred to herein as registration using a priori information, such as a CAD model (or a point cloud version of the CAD model). More specifically, in some instances there may exist a difference between seam dimensions on the part and seam dimensions in the CAD model, and the CAD model should be deformed (e.g., updated) to account for any such differences, as the CAD model may be subsequently used to perform path planning as described herein. Accordingly, the controller 108 compares a first seam (e.g., a candidate seam on a part 114 that has been verified as an actual seam) to a second seam (e.g., a seam annotated (e.g., by an operator/user) on the CAD model corresponding to the first seam) to determine differences between the first and second seams. Seams on the CAD model may be annotated as described above. The first seam and the second seam can be in nearly the same location, in instances in which the CAD model and/or controller 108 accurately predicts the location of the candidate seam. Alternatively, the first seam and the second seam can partially overlap, in instances in which the CAD model and/or controller 108 is partially accurate. The controller 108 may perform a comparison of the first seam and the second seam. This comparison of first seam and the second seam can be based in part on shape and relative location in space of both the seams. Should the first seam and the second seam be relatively similar in shape and be proximal to each other, the second seam can be identified as being the same as the first seam. In this way, the controller 108 can account for the topography of the surfaces on the part that are not accurately represented in the CAD models. In this manner, the controller 108 can identify candidate seams and can sub-select or refine or update candidate seams relative to the part using a CAD model of the part. Each candidate seam can be a set of updated points that represents the position and orientation of the candidate seam relative to the part.

Figure 6:
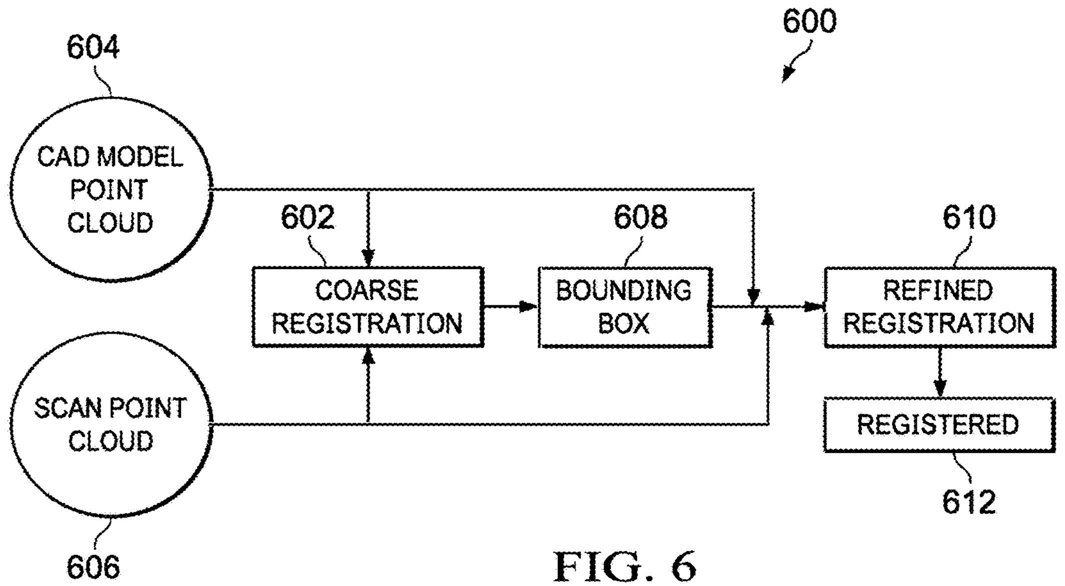
FIG. 6 is a block diagram illustrating a registration process flow in accordance with various examples.

FIG. 6 is a block diagram illustrating a registration process flow 600, in accordance with various examples. Some or all steps of the registration process flow 600 are performed by the controller I 08 (FIG. 1). The controller 108 may first perform a coarse registration 602 using a point cloud of a CAD model 604 and a scan point cloud 606 formed using images captured by the sensors I 02. The CAD model point cloud 604 and the scan point cloud 606 may be sampled such that their points have a uniform or approximately uniform dispersion and so that they both have equal or approximately equal point density. In examples, the controller 108 downsamples the point clouds 604, 606 by uniformly selecting points in the clouds at random to keep and discarding the remaining, non-selected points. For instance, in some examples, a Poisson Disk Sampling (PDS) down sampling algorithm may be implemented. The controller I 08 may provide as inputs to the PDS algorithm the boundaries of the point clouds 604, 606, minimum distance between samples, and a limit of samples to choose before they are rejected. In some examples, a delta network may be useful to deform one model to another model during coarse registration 602. The delta network may be a Siamese network that takes a source model and target model and encodes them into latent vectors. The controller I 08 may use the latent vectors to predict per-point deformations that morph or update one model to another. The delta network may not require a training dataset. Given the CAD model and scan point clouds 604, 606, the controller I 08 in the context of a Delta network spends one or more epochs learning the degree of dissimilarity or similarity between the two. During these epochs, the Delta network learns meaningful features that are subsequently useful for registration. While a Delta network may use skip connections to learn deformation, in some examples, skip connections may not be used. In some cases, CAD models include surfaces that are not present in 3D point cloud generated using the captured images (e.g., scans). In such cases, the Delta network moves all points corresponding to the missing surfaces from the CAD model point cloud 604 to some points in the scan point cloud 606 (and update the scan point cloud 606). Accordingly, during registration, the controller 108 (e.g., the Delta network) may use learned features and transform (or update) the original CAD model, or it may use the learned features and transform the deformed CAD model. In examples, the delta network may include an encoder network such as a dynamic graph convolutional neural network (DGCNN). After the point clouds are encoded into features, a concatenated vector composed of both CAD and scan embedding may be formed. After implementing a pooling operation (e.g., maxpooling), a decoder may be applied to the resultant vector. In some examples, the decoder may include five convolutional layers with certain filters (e.g., 256, 256, 512, 1024, N×3 filters). The resulting output may be concatenated with CAD model and scan embeddings, max pooled, and subsequently provided once more to the decoder. The final results may include per-point transformations.

Irrelevant data and noise in the data (e.g., the output of the coarse registration 602) may impact registration of the parts 114. For at least this reason, it is desirable to remove as much of the irrelevant data and noise as possible. A bounding box 608 is useful to remove this irrelevant data and noise (e.g., fixtures 116) in order to limit the area upon which registration is performed. Stated another way, data inside the bounding box is retained, but all the data, 3D or otherwise, from outside the bounding box is discarded. The aforementioned bounding box may be any shape that can enclose or encapsulate the CAD model itself (e.g., either partially or completely). For instance, the bounding box may be an inflated or scaled-up version of the CAD model. The data outside the bounding box may be removed from the final registration or may still be included but weighted to mitigate its impact.

Referring still to FIG. 6, during refined registration 610, the controller 108 passes the output of the bounding box 608 as patches through a set of convolutional layers in a neural network that was trained as an autoencoder. More specifically, the data may be passed through the encoder section of the autoencoder, and the decoder section of the autoencoder may not be used. The input data may be the XYZ locations of the points of the patch in the shape, for instance (128, 3). The output may be a vector of length 1024, for example, and this vector is useful for the per-point features.

A set of corresponding points that best support the rigid transformation between the CAD point cloud and scan point cloud models should be determined during registration.

Corresponding candidates may be stored (e.g., in the database 112) as a matrix in which each element stores the confidence or the probability of a match between two points:

$$P = \begin{bmatrix} p_{00} & p_{01} & \cdots & p_{0n} \\ \vdots & \ddots & & \vdots \\ p_{m0} & p_{m1} & \cdots & p_{mn} \end{bmatrix}_{[m_{matrix} \cdot m_{target}]}$$

Various methods are useful to find corresponding points from this matrix, for example, hard correspondence, soft correspondence, product manifold filter, graph clique, covariance, etc. After completion of the refined registration 610, the registration process is then complete (612).

As described above, in some instances, the actual location of a seam on a part 114 may differ from the seam location as determined by the controller 108 using sensor imaging (e.g., using scan point clouds) and/or as determined by a CAD model (e.g., using CAD model point clouds). In such cases, a scanning procedure (also sometimes referred herein as pre-scan) is useful to correct the determined seam location to more closely or exactly match the actual seam location on the part 114. In the scanning procedure, the sensor 102 that are positioned on the robot 110 (referred to herein as on-board sensors) perform a scan of the seam. In some instances, this scan may be performed using an initial motion and/or path plan generated by the controller 108 using the CAD model, the scan, or a combination thereof. For example, the sensors 102 may scan any or all areas of the workspace 101. During the performance of this initial motion and/or path plan, the sensors 102 may capture observational images and/or data. The observational images and/or data may be processed by the controller 108 to generate seam point cloud data. The controller 108 may use the seam point cloud data when processing the point cloud (s) 604 and/or 606 to correct the seam location. The controller 108 may also use seam point cloud data in correcting path and motion planning.

In some examples, the registration techniques described above may be useful to compare and match the seams determined using sensors 102 in addition to the on-board sensors 102 to those identified by the on-board sensors 102. By matching the seams in this manner, the robot 110 (and, more specifically, the head of the robot 110) is positioned relative to the actual seam as desired.

In some examples, the pre-scan trajectory of the robot 110 is identical to that planned for welding along a seam. In some such examples, the motion taken for the robot 110 during pre-scan may be generated separately so as to limit the probability or curtail the instance of collision, to better visualize the seam or key geometry with the onboard sensor 102, or to scan geometry around the seam in question.

In some examples, the pre-scan technique may include scanning more than a particular seam or seams, and rather may also include scanning of other geometry of the part(s) 114. The scan data may be useful for more accurate application of any or all of the techniques described herein (e.g., registration techniques) to find, locate, detect a seam and ensure the head of the robot 110 will be placed and moved along the seam as desired.

In some examples, the scanning technique (e.g., scanning the actual seam using sensors/cameras mounted on the weld arm/weld head) may be useful to identify gap variability information about the seams rather than position and orientation information about the seams. For example, the scan images captured by sensor(s) 102 on the robot 110 during a scanning procedure may be useful to identify variability in gaps and adjust the welding trajectory or path plan to account for such gaps. For example, in 3D points, 2D image pixels, or a combination thereof may be useful to locate variable gaps between parts 114 to be welded. In some examples, variable gap finding is useful, in which 3D points, 2D image pixels, or a combination thereof are useful to locate, identify, and measure the variable sizes of multiple gaps between parts 114 to be welded together. In tack weld finding or general weld finding, former welds or material deposits in gaps between parts 114 to be welded may be identified using 3D points and/or 2D image pixels. Any or all such techniques may be useful to optimize welding, including path planning. In some instances, the variability in gaps may be identified within the 3D point cloud generated using the images captured by sensors 102. In yet other instances, the variability in gaps may be identified a scanning technique (e.g., scanning the actual seam using sensors/cameras mounted on the weld arm/weld head) performed while performing a welding operation on the task. In any one of the instances, the controller 108 may be configured to adapt the welding instructions dynamically (e.g., welding voltage) based on the determined location and size of the gap. For example, the dynamically adjust welding instructions for the welding robots can result in precise welding of seam at variable gaps. Adjusting welding instructions may include adjusting one or more of: welder voltage, welder current, duration of an electrical pulse, shape of an electrical pulse, and material feed rate.

In examples, the user interface 106 can provide the user with an option to view candidate seams. For example, the user interface 106 may provide a graphical representation of a part 114 and/or candidate seams on a part 114. In addition or alternatively, the user interface 106 may group the candidate seam based on the type of seam. As described above, the controller 108 can identify the type of seam. For instance, candidate seams identified as lap joints can be grouped under a label "lap joints" and can be presented to the user via the user interface 106 under the label "lap joints." Similarly, candidate seams identified as edge joints can be grouped under a label "edge joints" and can be presented to the user via the user interface 106 under the label "edge joints."

The user interface 106 can further provide the user with an option to select a candidate seam to be welded by the robot 110. For example, each candidate seam on a part 114 can be presented as a press button on the user interface 106. When the user presses on a specific candidate seam, the selection can be sent to the controller 108. The controller 108 can generate instructions for the robot 110 to perform welding operations on that specific candidate seam.

In some examples, the user can be provided with an option to update welding parameters. For example, the user interface 106 can provide the user with a list of different welding parameters. The user can select a specific parameter to be updated. Changes to the selected parameter can be made using a drop-down menu, via text input, etc. This update can be transmitted to the controller 108 so that the controller 108 can update the instructions for the robot 110.

In examples for which the system 100 is not provided with a priori information (e.g., a CAD model) of the part 114, the sensor(s) 102 can scan the part 114. A representation of the part 114 can be presented to the user via the user interface 106. This representation of the part 114 can be a point cloud and/or a mesh of the point cloud that includes projected 3D data of the scanned image of the part 114 obtained from the sensor(s) 102. The user can annotate seams that are to be welded in the representation via the user interface 106. Alternatively, the controller 108 can identify candidate seams in the representation of the part 114. Candidate seams can be presented to the user via the user interface 106. The user can select seams that are to be welded from the candidate seams. The user interface 106 can annotate the representation based on the user's selection. The annotated representation can be saved in the database 112, in some examples.

After one or more seams on the part(s) 114 have been identified and corrected to the extent possible using the techniques described above (or using other suitable techniques), the controller 108 plans a path for the robot 110 during a subsequent welding process. In some examples, graph-matching and/or graph-search techniques may be useful to plan a path for the robot 110. A particular seam identified as described above may include multiple points, and the path planning technique entails determining a different state of the robot 110 for each such point along a given seam. A state of the robot 110 may include, for example, a position of the robot 110 within the workspace 101 and a specific configuration of the arm of the robot 110 in any number of degrees of freedom that may apply. For instance, for a robot 110 that has an arm having six degrees of freedom, a state for the robot 110 would include not only the location of the robot 110 in the workspace 101 (e.g., the location of the weld head of the robot 110 in three-dimensional, x-y-z space), but it would also include a specific sub-state for each of the robot arm's six degrees of freedom. Furthermore, when the robot 110 transitions from a first state to a second state, it may change its location within the workspace 101, and in such a case, the robot 110 necessarily would traverse a specific path within the workspace 101 (e.g., along a seam being welded). Thus, specifying a series of states of the robot 110 necessarily entails specifying the path along which the robot 110 will travel within the workspace 101. The controller 108 may perform the pre-scan technique or a variation thereof after path planning is complete, and the controller 108 may use the information captured during the pre-scan technique to make any of a variety of suitable adjustments (e.g., adjustment of the X-Y-Z axes or coordinate system used to perform the actual welding along the seam).

Figure 7:
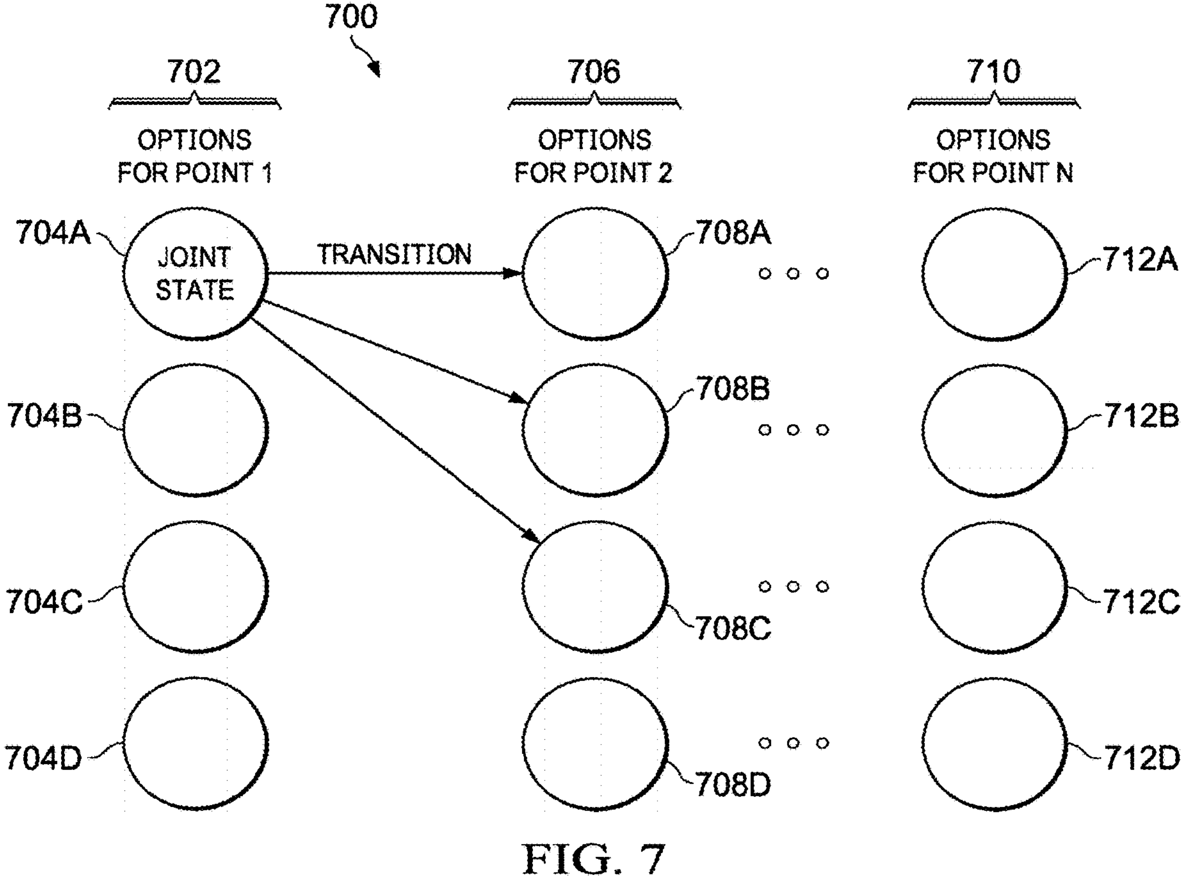
FIG. 7 is a schematic diagram of a graph-search technique by which the path plan for a robot may be determined, in accordance with various examples.

FIG. 7 is a schematic diagram 700 of a graph-search technique by which the path plan for the robot 110 may be determined (e.g., by the controller 108). Each circle in the diagram 700 represents a different state of the robot 110 (e.g., a specific location of the robot 110 (e.g., the location of the weld head of the robot 110 in 3D space) within the workspace 101 and a different configuration of the arm of the robot 110, as well as a position and/or configuration of a fixture supporting the part, such as a positioner, clamp, etc.). Each column 702, 706, and 710 represents a different point along a seam to be welded. Thus, for the seam point corresponding to column 702, the robot 110 may be in any one of states 704A-704D. Similarly, for the seam point corresponding to column 706, the robot 110 may be in any one of states 708A-708D. Likewise, for the seam point corresponding to column 710, the robot 110 may be in any one of states 712A-712D. If, for example, the robot 110 is in state 704A when at the seam point corresponding to column 702, the robot 110 may then transition to any of the states 708A-708D for the next seam point corresponding to the column 706. Similarly, upon entering a state 708A-708D, the robot 110 may subsequently transition to any of the states 712A-712D for the next seam point corresponding to the column 710, and so on. In some examples, entering a particular state may preclude entering other states. For example, entering state 704A may permit the possibility of subsequently entering states 708A-708C, but not 708D, whereas entering state 704B may permit the possibility of subsequently entering states 708C and 708D, but not states 708A-708B. The scope of this disclosure is not limited to any particular number of seam points or any particular number of robot 110 states.

In some examples, to determine a path plan for the robot 110 using the graph-search technique (e.g., according to the technique depicted in the diagram 700), the controller 108 may determine the shortest path from a state 704A-704D to a state corresponding to a seam point N (e.g., a state 712A-712D). By assigning a cost to each state and each transition between states, an objective function can be designed by the controller 108. The controller 108 finds the path that results in the least possible cost value for the objective function. Due to the freedom of having multiple starts and endpoints to choose from, graph search methods like Dijkstra's algorithm or A* may be implemented. In some examples, a brute force method may be useful to determine a suitable path plan. The brute force technique would entail the controller 108 computing all possible paths (e.g., through the diagram 700) and choosing the shortest one.

The controller 108 may determine whether the state at each seam point is feasible, meaning at least in part that the controller 108 may determine whether implementing the chain of states along the sequence of seam points of the seam will cause any collisions between the robot 110 and structures in the workspace 101, or even with parts of the robot 110 itself. To this end, the concept of realizing different states at different points of a seam may alternatively be expressed in the context of a seam that has multiple waypoints. First, the controller 108 may discretize an identified seam into a sequence of waypoints. A waypoint may constrain an orientation of the weld head connected to the robot 120 in three (spatial/translational) degrees of freedom. Typically, constraints in orientation of the weld head of the robot 120 are provided in one or two rotational degrees of freedom about each waypoint, for the purpose of producing some desired weld of some quality; the constraints are typically relative to the surface normal vectors emanating from the waypoints and the path of the weld seam. For example, the position of the weld head can be constrained in x-, y-, and z-axes, as well as about one or two rotational axes perpendicular to an axis of the weld wire or tip of the welder, all relative to the waypoint and some nominal coordinate system attached to it. These constraints in some examples may be bounds or acceptable ranges for the angles. Those skilled in the art will recognize that the ideal or desired weld angle may vary based on part or seam geometry, the direction of gravity relative to the seam, and other factors. In some examples, the controller 108 may constrain in IF or 2F weld positions to ensure that the seam is perpendicular to gravity for one or more reasons (such as to find a balance between welding and path planning for optimization purposes). The position of the weld head can therefore be held (constrained) by each waypoint at any suitable orientation relative to the seam. Typically, the weld head will be unconstrained about a rotational axis (θ) coaxial with an axis of the weld head. For instance, each waypoint can define a position of the weld head of the welding robot 120 such that at each waypoint, the weld head is in a fixed position and orientation relative to the weld seam. In some implementations, the waypoints are discretized finely enough to make the movement of the weld head substantially continuous.

The controller I 08 may divide each waypoint into multiple nodes. Each node can represent a possible orientation of the weld head at that waypoint. As a non-limiting example, the weld head can be unconstrained about a rotational axis coaxial with the axis of the weld head such that the weld head can rotate (e.g., 360 degrees) along a rotational axis 8 at each waypoint. Each waypoint can be divided into 20 nodes, such that each node of each waypoint represents the weld head at 18 degree of rotation increments. For instance, a first waypoint-node pair can represent rotation of the weld head at 0 degrees, a second waypoint-node pair can represent rotation of the weld head at from 18 degrees, a third waypoint-node pair can represent rotation of the weld head at 36 degrees, etc. Each waypoint can be divided into 2, 10, 20, 60, 120, 360, or any suitable number of nodes. The subdivision of nodes can represent the division of orientations in more than I degree of freedom. For example, the orientation of the welder tip about the waypoint can be defined by 3 angles. A weld path can be defined by linking each waypoint-node pair. Thus, the distance between waypoints and the offset between adjacent waypoint nodes can represent an amount of translation and rotation of the weld head as the weld head moves between node-waypoint pairs.

The controller 108 can evaluate each waypoint-node pair for feasibility of welding. For instance, consider the non-limiting example of dividing waypoint into 20 nodes. The controller 108 can evaluate whether the first waypoint-node pair representing the weld head held at 0 degrees would be feasible. Put differently, the controller 108 can evaluate whether the robot 110 would collide or interfere with the part, the fixture, or the welding robot itself, if placed at the position and orientation defined by that waypoint-node pair. In a similar manner, the controller 108 can evaluate whether the second waypoint-node pair, third waypoint-node pair, etc., would be feasible. The controller 108 can evaluate each waypoint similarly. In this way, all feasible nodes of all waypoints can be determined.

In some examples, a collision analysis as described herein may be performed by comparing a 3D model of the workspace 101 and a 3D model of the robot 110 to determine whether the two models overlap, and optionally, some or all of the triangles overlap. If the two models overlap, the controller 108 may determine that a collision is likely. If the two models do not overlap, the controller 108 may determine that a collision is unlikely. More specifically, in some examples, the controller 108 may compare the models for each of a set of waypoint-node pairs (such as the waypoint-node pairs described above) and determine that the two models overlap for a subset, or even possibly all, of the waypoint-node pairs. For the subset of waypoint-node pairs with respect to which model intersection is identified, the controller 108 may omit the waypoint-node pairs in that subset from the planned path and may identify alternatives to those waypoint-node pairs. The controller 108 may repeat this process as needed until a collision-free path has been planned. The controller 108 may use a flexible collision library (FCL), which includes various techniques for efficient collision detection and proximity computations, as a tool in the collision avoidance analysis. The FCL is useful to perform multiple proximity queries on different model representations, and it may be used to perform probabilistic collision identification between point clouds. Additional or alternative resources may be used in conjunction with or in lieu of the FCL.

The controller I 08 can generate one or more feasible simulate (or evaluate, both terms used interchangeably herein) weld paths should they physically be feasible. A weld path can be a path that the welding robot takes to weld the candidate seam. In some examples, the weld path may include all the waypoints of a seam. In some examples, the weld path may include some but not all the waypoints of the candidate seam. The weld path can include the motion of the robot and the weld head as the weld head moves between each waypoint-node pair. Once a feasible path between node-waypoint pairs is identified, a feasible node-waypoint pair for the next sequential waypoint can be identified should it exist. Those skilled in the art will recognize that many search trees or other strategies may be employed to evaluate the space of feasible node-waypoint pairs. As discussed in further detail herein, a cost parameter can be assigned or calculated for movement from each node-waypoint pair to a subsequent node-waypoint pair. The cost parameter can be associated with a time to move, an amount of movement (e.g., including rotation) between node-waypoint pairs, and/or a simulated/expected weld quality produced by the weld head during the movement.

In instances in which no nodes are feasible for welding for one or more waypoints and/or no feasible path exists to move between a previous waypoint-node pair and any of the waypoint-node pairs of a particular waypoint, the controller 108 can determine alternative welding parameters such that at least some additional waypoint-node pairs become feasible for welding. For example, if the controller 108 determines that none of the waypoint-node pairs for a first waypoint are feasible, thereby making the first waypoint unweldable, the controller 108 can determine an alternative welding parameters such as an alternative weld angle so that at least some waypoint-node pairs for the first waypoint become weldable. For example, the controller 108 can remove or relax the constraints on rotation about the x and/or y axis. Similarly stated, the controller 108 can allow the weld angle to vary in one or two additional rotational (angular) dimensions. For example, the controller 108 can divide waypoint that is unweldable into two- or three-dimensional nodes. Each node can then be evaluated for welding feasibility of the welding robot and weld held in various weld angles and rotational states. The additional rotation about the x- and/or y-axes or other degrees of freedom may make the waypoints accessible to the weld head such that the weld head does not encounter any collision. In some implementations, the controller 108—in instances in which no nodes are feasible for welding for one or more waypoints and/or no feasible path exists to move between a previous waypoint-node pair and any of the waypoint-node pairs of a particular waypoint—can use the degrees of freedom provided by the positioner system in determining feasible paths between a previous waypoint-node pair and any of the waypoint-node pairs of a particular waypoint.

Based on the generated weld paths, the controller 108 can optimize the weld path for welding. (Optimal and optimize, as used herein, does not refer to determining an absolute best weld path, but generally refers to techniques by which weld time can be decreased and/or weld quality improved relative to less efficient weld paths.) For example, the controller 108 can determine a cost function that seeks local and/or global minima for the motion of the robot 110. Typically, the optimal weld path minimizes weld head rotation, as weld head rotation can increase the time to weld a seam and/or decrease weld quality. Accordingly, optimizing the weld path can include determining a weld path through a maximum number of waypoints with a minimum amount of rotation.

In evaluating the feasibility of welding at each of the divided nodes or node-waypoint pairs, the controller 108 may perform multiple computations. In some examples, each of the multiple computations may be mutually exclusive from one another. In some examples, the first computation may include kinematic feasibility computation, which computes for whether the arm of the robot 110 of the welding robot being employed can mechanically reach (or exist) at the state defined by the node or node-waypoint pair. In some examples, in addition to the first computation, a second computation—which may be mutually exclusive to the first computation—may also be performed by the controller 108. The second computation may include determining whether the arm of the robot 110 will encounter a collision (e.g., collide with the workspace 101 or a structure in the workspace 101) when accessing the portion of the seam (e.g., the node or node-waypoint pair in question).

The controller 108 may perform the first computation before performing the second computation. In some examples, the second computation may be performed only if the result of the first computation is positive (e.g., if it is determined that the arm of the robot 110 can mechanically reach (or exist) at the state defined by the node or node-waypoint pair). In some examples, the second computation may not be performed if the result of the first computation is negative (e.g., if it is determined that the arm of the robot 110 cannot mechanically reach (or exist) at the state defined by the node or node-waypoint pair).

The kinematic feasibility may correlate with the type of robotic arm employed. For the purposes of this description, it is assumed that the welding robot 110 includes a six-axis robotic welding arm with a spherical wrist. The six-axis robotic arm can have 6 degrees of freedom-three degrees of freedom in X-, Y-, Z-cartesian coordinates and three additional degrees of freedom because of the wrist-like nature of the robot 110. For example, the wrist-like nature of the robot 110 results in a fourth degree of freedom in wrist-up/-down manner (e.g., wrist moving in +y and −y direction), a fifth degree of freedom in wrist-side manner (e.g., wrist moving in −x and +x direction), and sixth degree of freedom in rotation. In some examples, the welding torch is attached to the wrist portion of the robot 110.

Figures 8, 9:
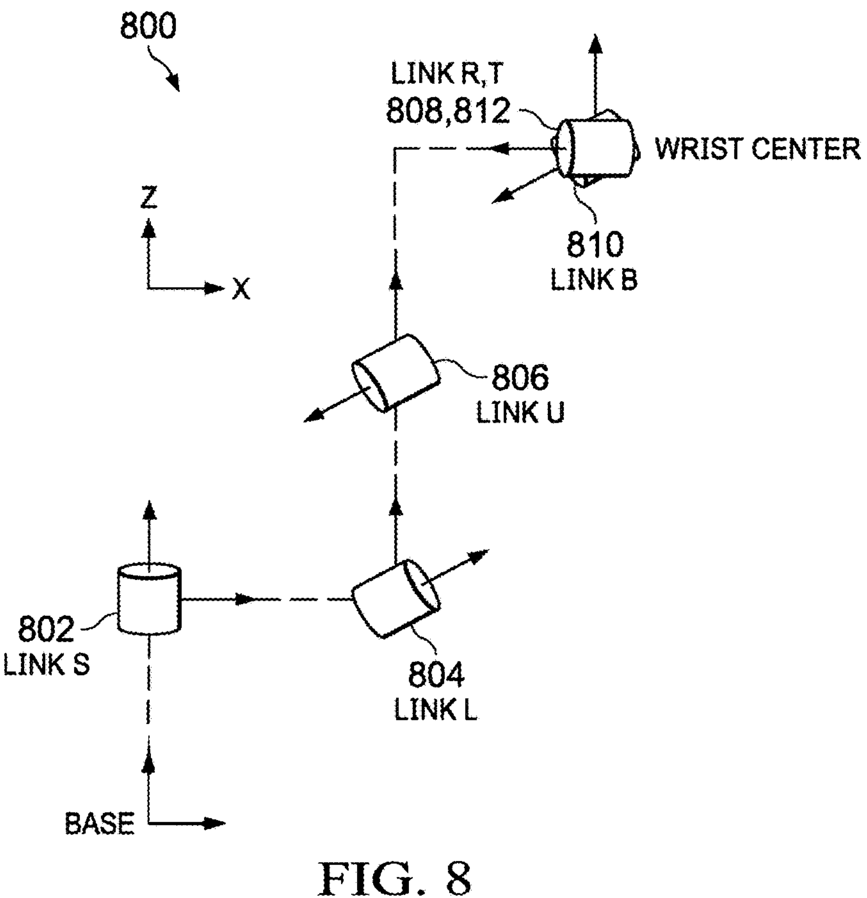
FIG. 8 is a mathematical model of a robotic arm, in accordance with various examples.
FIG. 9 is a flow diagram of a method for performing autonomous welds, in accordance with various examples.

To determine whether the arm of the robot 110 being employed can mechanically reach (or exist) at the state defined by the node or node-waypoint pair—i.e., to perform the first computation—the robot 110 may be mathematically modeled as shown in the example model 800 of FIG. 8. In some examples, the controller 108 may solve for the first three joint variables based on a wrist position and solve for the other three joint variables based on wrist orientation. It is noted that the torch is attached rigidly on the wrist. Accordingly, the transformation between torch tip and wrist is assumed to be fixed. To find the first three joint variables (e.g., variables S, L, U at 802, 804, 806, respectively), the geometric approach (e.g., law of cosine) may be employed.

After the first three joint variables (i.e., S, L, U) are computed successfully, the controller 108 may then solve for the last three joint variables (i.e., R, B, T at 808, 810, 812, respectively) by, for example, considering wrist orientation as a Z-Y-Z Euler angle. The controller 108 may consider some offsets in the robot 110. These offsets may need to be considered and accounted for because of inconsistencies in the unified robot description format (URDF) file. For example, in some examples, values (e.g., a joint's X axis) of the position of a joint (e.g., actual joint of the robot 110) may not be consistent with the value noted in its URDF file. Such offset values may be provided to the controller 108 in a table. The controller 108, in some examples, may consider these offset values while mathematically modeling the robot 110. In some examples, after the robot 110 is mathematically modeled, the controller 108 may determine whether the arm of the robot 110 can mechanically reach (or exist) at the states defined by the node or node-waypoint pair.

As noted above, the controller 108 can evaluate whether the robot 110 would collide or interfere with the part 114, the fixture 116, or anything else in the workspace 101, including the robot 110 itself, if placed at the position and orientation defined by that waypoint-node pair. Once the controller 108 determines the states in which the robotic arm can exist, the controller 108 may perform the foregoing evaluation (e.g., regarding whether the robot would collide something in its environment) using the second computation.

FIG. 9 is a flow diagram of a method 900 for performing autonomous welds, in accordance with various examples. More specifically, FIG. 9 is a flowchart of a method 900 for operating and controlling welding robots (e.g., robot 110 in FIG. 1), according to some examples. At step 902, the method 900 includes obtaining image data of a workspace (e.g., workspace 101 in FIG. 1) using one or more sensors (e.g., sensor(s) 102 in FIG. 1). The image data can include 2D and/or 3D images of the workspace. As described above, one or more parts to be welded, fixtures and/or clamps that can hold the parts in a secure manner can be located in the workspace. In some examples, a point cloud can be generated from the image data. For example, the images can be overlapped with one another to reconstruct and generate three-dimensional image data. The three-dimensional image data can be collated together to generate the point cloud.

At step 904, the method 900 includes identifying a set of points on the part to be welded based on the sensor data, which may be images. The set of points can represent the possibility of a seam that is to be welded. In some examples, a neural network can perform pixel-wise segmentation on the image data to identify the set of points. Fixtures and clamps in the image data can be classified by the neural network based on image classification. The portions of the image data associated with the fixtures and/or the clamps can be segmented out such that those portions of the image data are not used to identify the set of points, which can reduce computational resources required to identify set of points to be welded by decreasing the search space. In such examples, the set of points can be identified from other portions of the image data (e.g., portions of the image data that are not segmented out).

At step 906, the method 900 includes identifying a candidate seam from the set of points. For example, a subset of points within the set of points can be identified as a candidate seam. A neural network can perform image classification and/or depth classification to identify the candidate seam. In some examples, the candidate seam can be localized relative to the part. For example, a position and an orientation for the candidate seam can be determined relative to the part in order to localize the candidate seam.

Additionally, method 900 further includes verifying whether the candidate seam is an actual seam. As discussed above, the sensor(s) can collect image data from multiple angles. For each image captured from a different angle, a confidence value that represents whether the candidate seam determined from that angle is an actual seam can be determined. When the confidence value is above a threshold based on views taken from multiple angles, the candidate seam can be verified as an actual seam. In some embodiments, the method 900 also includes classifying the candidate seam as a type of seam. For example, a neural network can determine if the candidate seam is a butt joint, a corner joint, an edge joint, a lap joint, a tee joint, and/or the like.

In some examples, after the candidate seam has been identified and verified, the subset of points can be clustered together to form a contiguous and continuous seam. At step 908, the method 900 includes generating welding instructions for a welding robot based on the candidate seam. For example, the welding instructions can be generated by tracing a path from one end of the subset of points to the other end of the subset of points. This can generate a path for the seam. Put differently, the weld can be made by tracing this path with the welding head. Additionally, path planning can be performed based on the identified and localized candidate seam. For example, path planning can be performed based on the path for the seam that can be generated from clustering the subset of points.

In some examples, the welding instructions can be based on the type of seam (e.g., butt joint, corner joint, edge joint, lap joint, tee joint, and/or the like). In some examples, the welding instructions can be updated based on input from a user via a user interface (e.g., user interface 106 in FIG. 1). The user can select a candidate seam to be welded from all the available candidate seams via the user interface. Path planning can be performed for the selected candidate seam and welding instructions can be generated for the selected candidate seam. In some examples, a user can update welding parameters via a user interface. The welding instructions can be updated based on the updated welding parameters.

In this manner, welding robots can be operated and controlled by implementing method 900 without a priori information (e.g., a CAD model) of the parts to be welded. Since the parts are scanned in order to generate welding instructions, a representation of the scanned image of the part can be annotated with one or more candidate seams (e.g., via a user interface). The annotated representation can be used to define a 3D model of the part. The 3D model of the part can be saved in a database for subsequent welding of additional instances of the part.

Figure 10:
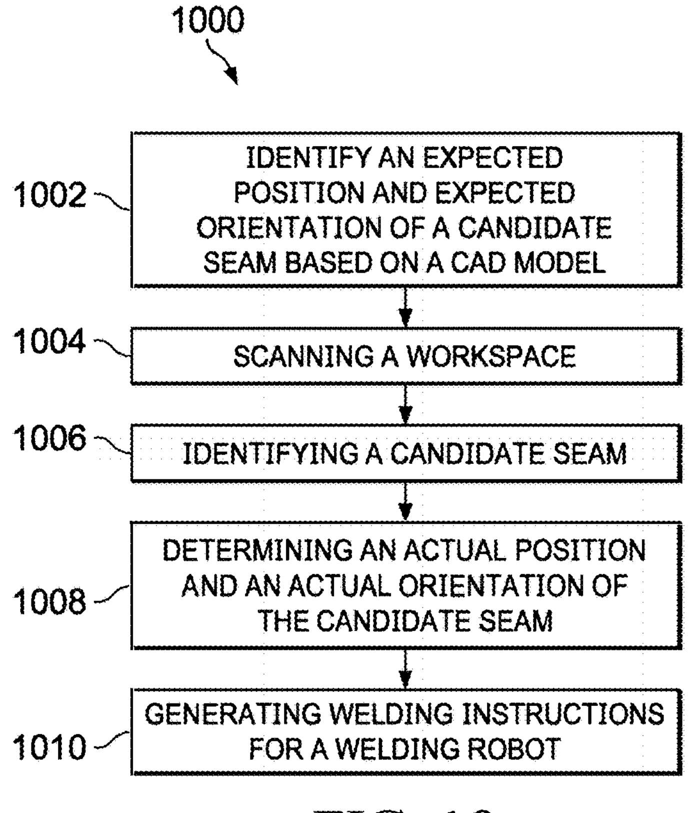
FIG. 10 is a flow diagram of a method for performing autonomous welds, in accordance with various examples.

FIG. 10 is a flow diagram of a method 1000 for performing autonomous welds, m accordance with various examples. More specifically, FIG. 10 is a flowchart of a method 1000 for operating and controlling welding robots (e.g., robot 110 in FIG. 1), according to some examples. At step 1002, the method 1000 includes identifying an expected orientation and an expected position of a candidate seam on a part to be welded based on a CAD model of the part. The expected orientation and expected position may be determined using the annotations provided by a user/operator to the CAD model. Additionally, or alternatively, a controller (e.g., controller 108 in FIG. 1) can be operable to identify candidate seams based on the model geometry. Object matching can be performed to match components on the part to the components in the CAD model. In other words, the expected position and orientation of a candidate seam can be identified based on the object matching.

At step 1004, the method 1000 includes obtaining image data of a workspace (e.g., workspace 101 in FIG. 1) using one or more sensors (e.g., sensor(s) 102 in FIG. 1). The image data can include 2D and/or 3D images of the workspace. As discussed above, the workspace can include one or more parts to be welded and fixtures and/or clamps that can hold the parts in a secure manner. In some examples, a point cloud can be generated from the image data. For example, the images can be overlapped with one another to reconstruct and generate 3D image data. The 3D image data can be collated together to generate the point cloud.

In some examples, in order to reduce the processing time to generate welding instructions, the sensors are configured to perform a partial scan. Put differently, instead of scanning the workspace from every angle, the image data is collected from a few angles (e.g., angles from which a candidate seam is expected to be visible). In such examples, the point cloud generated from the image data is a partial point cloud. Generating a partial point cloud that, for example, does not include portions of the part that the model indicates do not contain seams to be welded, can reduce scanning and/or processing time.

At step 1006, the method 1000 includes identifying the candidate seam based on the image data, the point cloud, and/or the partial point cloud. For example, the controller 108 (FIG. 1) can identify the candidate seam using the techniques described above.

At step 1008, the method 1000 includes identifying the actual position and the actual orientation of the candidate seam. For example, at step 1002 a first subset of points can be identified as a modeled seam. At step 1006, a second subset of points can be identified as the candidate seam. In some examples, the first subset of points and the second subset of points can be compared (e.g., using the registration techniques described above with respect to FIG. 6). The first subset of points can be allowed to deform to determine the actual position and orientation of the candidate seam. In some examples, the comparison between the first subset of points and the second subset of points can help determine a tolerance for the first subset of points (e.g., the expected location and the expected orientation of the candidate seam). In such examples, the first subset of points can be allowed to deform based on the tolerance to determine the actual position and orientation of the candidate seam. Put differently, the expected position and the expected orientation of the candidate seam can be refined (in some examples, based on the tolerance) to determine the actual position and the actual orientation of the candidate seam. This deforming/refining technique can account for the topography of the surfaces on the part that are not accurately represented in the CAD models (e.g., in the CAD model at step 1002).

At step 1010, the method 1000 includes generating welding instructions for the welding robot based on the actual position and the actual orientation of the candidate seam. For example, the path planning can be performed based on the actual position and the actual orientation of the candidate seam.

Like method 900 in FIG. 9, once the actual position and the actual orientation of the candidate seam is identified, the method 1000 can include verifying the candidate seam using the techniques described above. However, in contrast to method 900, the method 1000 user interaction may not be necessary. This is because one or more seams to be welded may already be annotated in the CAD model. Therefore, in some instances, welding robots can be operated and controlled by implementing method 1000 without any user interaction.

Additionally, or alternatively to the steps described above with respect to method 1000, the welding robots (e.g., robot 110 in FIG. 1) may operate and control the welding robot for performing autonomous welds in the following manner. The robot 110, particularly the controller 108 of the robot 11, may scan a workspace containing the part to determine a location of the part (e.g., location of the part on the positioner) within the workspace and to produce a representation (e.g., point cloud representation) of the part. The controller 108 may be provided with annotated CAD model of the part. The controller 108 may then determine an expected position and expected orientation of a candidate seam on the part in accordance with (or based on) a Computer Aided Design (CAD) model of the part and the representation of the part. For example, the controller 108 can be operable to identify the candidate seams based on the model geometry—object matching can be performed to match components or features (e.g., topographical features) on the representation of part to the components or features in the CAD model), and the controller 108 may be operable to use this object matching in determining the expected position and expected orientation of the candidate seam on the part. Once the expected position and orientation is determined, the controller 108 may then determine an actual position and actual orientation of the candidate seam based at least in part on the representation of the part. The actual position and orientation may be determined using the deforming/refining technique described in step 1008.

Figure 11:
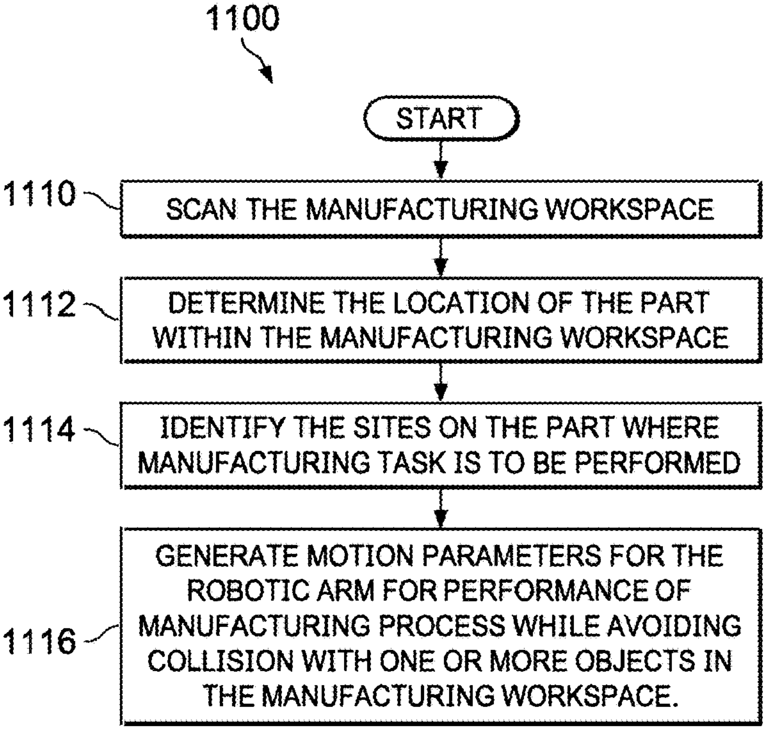
FIG. 11 is a flow diagram of a method for performing autonomous welds, in accordance with various examples.

FIG. 11 is a flow diagram of a method 1100 for performing autonomous welds, m accordance with various examples. More specifically, in FIG. 11 an example method 1100 of operation of the manufacturing robot 110 (FIG. 1) in a robotic manufacturing environment is shown. It is assumed that one or more parts 114 on which a manufacturing task (e.g., welding) is to be performed are positioned and/or fixed using fixtures 116 onto another fixture 116 (e.g., a positioner) in the manufacturing workspace 101. Following the placement of the one or more parts 114, method 1100 may begin. As an initial step, method 1100 includes scanning of the one or more parts (e.g., block 1110). The scanning may be performed by one or more sensors 102 (e.g., scanners that are not coupled to the robot 110); the controller 108 may be configured to determine the location of the part within the manufacturing workspace 101 and identify one or more seams on the part using image data acquired from the sensors and/or a point cloud derived from the images or sensor data (blocks 1112 and 1114). The part and seam may be located and identified based on one of the techniques described with respect to FIG. 1. Once the part and a seam location is determined, the controller 108 plots a path for the manufacturing robot 110 along the identified seam (block 1116). The path plotted may include optimized motion parameters of the manufacturing robot 110 to complete a weld without colliding with itself or anything else in the manufacturing workspace 101. No human input is required in the generation of optimized motion parameters of the manufacturing robot 110 to complete a weld. The path/trajectory may be planned based on one of the path planning techniques described above.

The terms "position" and "orientation" are spelled out as separate entities in the disclosure above. However, the term "position" when used in context of a part means "a particular way in which a part is placed or arranged." The term "position" when used in context of a seam means "a particular way in which a seam on the part is positioned or oriented." As such, the position of the part/seam may inherently account for the orientation of the part/seam. As such, "position" can include "orientation." For example, position can include the relative physical position or direction (e.g., angle) of a part or candidate seam.

Unless otherwise stated, "about," "approximately," or "substantially" preceding a value means+/−10 percent of the stated value. Unless otherwise stated, two objects described as being "parallel" are side by side and have a distance between them that is constant or varies by no more than 10 percent. Unless otherwise stated, two objects described as being perpendicular intersect at an angle ranging from 80 degrees to 100 degrees. Modifications are possible in the described examples, and other examples are possible within the scope of the claims.

What is claimed is:

1. A robotic welding system, comprising:

one or more sensors configured to scan a first part and a second part positioned within a manufacturing workspace to form a seam to be welded using a welding tool coupled to a robotic arm; and a controller comprising a non-transitory computer-readable medium storing logic configured to be executed by a processor, the logic being configured to cause the processor to:

receive a set of welding parameters and at least one computer aided design model (CAD model) of the first part and the second part in the non-transitory computer-readable medium;

instruct the one or more sensors to scan the manufacturing workspace;

generate a representation of the first part and the second part in the manufacturing workspace based upon data received from the one or more sensors;

perform a registration process based upon the CAD model and the representation to determine an actual location of the seam in the manufacturing workspace; and instruct a user interface to display the seam, the representation, and/or the CAD model.

2. The robotic welding system of claim 1, wherein the logic is configured to cause the processor to:

generate, based on the representation, a plurality of point-node pairs, each point-node pair comprising a point on the seam and a node representing one or more parameters of the welding tool;

identify a subset of feasible point-node pairs based upon an evaluation of each point-node pair for feasibility of welding;

generate weld instructions for the robotic arm and welding tool, based upon the set of welding parameters, wherein the weld instructions comprise a weld path of the welding tool extending through a plurality of the feasible point-node pairs; and initiate execution of the weld instructions by the robotic arm and welding tool.

3. The robotic welding system of claim 2, wherein identifying the subset of feasible point-node pairs comprises evaluating each point-node pair for kinematic feasibility by determining whether the robotic arm can reach a state defined by the point-node pair.

4. The robotic welding system of claim 3, wherein identifying the subset of feasible point-node pairs further comprises evaluating whether the robotic arm will collide with a structure in the manufacturing workspace when accessing the point-node pair.

5. The robotic welding system of claim 2, wherein each point-node pair comprises: a waypoint constraining at least an orientation of a weld head of the robotic arm in at least three spatial degrees of freedom and a node representing a rotational orientation of the weld head about an axis coaxial with the weld head.

6. The robotic welding system of claim 5, wherein each waypoint is associated with a plurality of nodes.

7. The robotic welding system of claim 2, wherein identifying the subset of feasible point-node pairs comprises modeling the robotic arm as a six-axis robotic arm with a spherical wrist having six degrees of freedom comprising three cartesian coordinate degrees of freedom and three wrist orientation degrees of freedom.

8. The robotic welding system of claim 7, wherein identifying the subset of feasible point-node pairs further comprises solving for a first three joint variables based on a wrist position and solving for a second three joint variables based on a wrist orientation.

9. The robotic welding system of claim 2, wherein identifying the subset of feasible point-node pairs comprises comparing a three-dimensional model of the manufacturing workspace with a three-dimensional model of the robotic arm to determine whether the three-dimensional models overlap.

10. The robotic welding system of claim 9, wherein point-node pairs resulting in model overlap are omitted from the subset of feasible point-node pairs.

11. The robotic welding system of claim 2, wherein the controller is further configured to relax one or more constraints on rotation about one or more axes when no feasible point-node pairs are identified for a waypoint.

12. The robotic welding system of claim 1, further comprising the robotic arm.

13. A controller for a robotic welding system, comprising one or more sensors configured to scan a first part and a second part positioned within a manufacturing workspace to form a seam to be welded using a welding tool coupled to a robotic arm, the controller comprising a non-transitory computer-readable medium storing logic configured to be executed by a processor, the logic being configured to cause the processor to:

receive a set of welding parameters and at least one computer aided design model (CAD model) of the first part and the second part in the non-transitory computer-readable medium;

instruct the one or more sensors to scan the manufacturing workspace;

generate a representation of the first part and the second part in the manufacturing workspace based upon data received from the one or more sensors;

perform a registration process based upon the CAD model and the representation to determine an actual location of the seam in the manufacturing workspace; and instruct a user interface to display the seam, the representation, and/or the CAD model.

* * * * *